United States Patent [19]
Ikeda et al.

[11] Patent Number: 5,358,318
[45] Date of Patent: Oct. 25, 1994

[54] DUTY CYCLE CONTROLLER FOR ANTI-LOCK BRAKE PRESSURE REGULATING VALVE, USING WHEEL SPEED DEVIATION FROM TARGET VALUE AND TIME DERIVATIVE THEREOF

[75] Inventors: Shinji Ikeda; Masashi Mizukoshi, both of Susono, Japan

[73] Assignee: Toyota Jidosha Kabushiki Kaisha, Toyota, Japan

[21] Appl. No.: 214,499

[22] Filed: Mar. 18, 1994

Related U.S. Application Data

[62] Division of Ser. No. 942,981, Sep. 10, 1992.

[30] Foreign Application Priority Data

Sep. 24, 1991 [JP] Japan ................................. 3-273317
Dec. 2, 1991 [JP] Japan ................................. 3-347917

[51] Int. Cl.⁵ ............................................. B60T 8/32
[52] U.S. Cl. ........................... 303/100; 188/181 R; 303/102; 303/108; 303/109
[58] Field of Search ............... 303/100, 102, 103, 105, 303/113.4, 105, 106, 107, 108, 109, 110, 98, 96; 342/70; 367/91; 364/426.01, 426.02, 426.03; 188/181 A, 181 R; 180/197, 167

[56] References Cited

U.S. PATENT DOCUMENTS

| | | |
|---|---|---|
| 3,953,083 | 4/1976 | Latrala et al. ............... 303/103 |
| 4,346,774 | 8/1982 | Hirota et al. . |
| 4,432,229 | 2/1984 | Nowogrodzki . |
| 4,713,665 | 12/1987 | Phelan . |
| 4,900,101 | 2/1990 | Becker et al. . |
| 4,932,726 | 6/1990 | Iwata et al. . |
| 4,986,611 | 1/1991 | Goshima et al. ............... 303/106 X |
| 5,204,682 | 4/1993 | Beasley . |
| 5,243,564 | 9/1993 | Ikeda et al. ............... 367/91 |
| 5,287,329 | 2/1994 | Ikeda ............... 367/91 |

FOREIGN PATENT DOCUMENTS

| | | |
|---|---|---|
| 3825639 | 2/1990 | Fed. Rep. of Germany . |
| 63-64861 | 3/1988 | Japan . |
| 2-70561 | 3/1990 | Japan . |
| 2-129960 | 10/1990 | Japan . |

*Primary Examiner*—Douglas C. Butler
*Attorney, Agent, or Firm*—Oliff & Berridge

[57] ABSTRACT

Vehicle anti-lock brake control apparatus having wheel speed sensor for detecting actual speed of a vehicle wheel, solenoid-operated valve for regulating the wheel braking pressure, and controller for controlling the valve, on the basis of the detected actual speed, and vehicle ground-speed detected by ground-speed sensor. The controller controls the valve at a controlled duty cycle, which is determined on the basis of at least a wheel speed error and a time derivative of this error. The error is obtained as a deviation of the detected actual wheel speed from a target wheel speed obtained on the basis of the detected vehicle ground-speed.

14 Claims, 17 Drawing Sheets

DUTY CYCLE CONTROLLER FOR ANTI-LOCK BRAKE PRESSURE REGULATING VALVE, USING WHEEL SPEED DEVIATION FROM TARGET VALUE AND TIME DERIVATIVE THEREOF

This is a division of Application No. 07/942,981 filed Sep. 10, 1992.

BACKGROUND OF THE INVENTION

1. Field of the Invention

The present invention relates in general to a control apparatus for controlling an anti-lock or anti-skid brake system for a vehicle, and more particularly to a technique for improving the accuracy of control of the control apparatus.

2. Discussion of the Prior Art

The anti-lock brake control system generally includes (a) a plurality of wheel speed sensors for detecting actual speeds of respective wheels of a motor vehicle, (b) an electrically controlled brake pressure regulating device having at least one solenoid-operated valve for regulating the braking pressure applied to each of the wheels, and (c) a controller for controlling the pressure regulating device so as to prevent locking or skidding of the wheel on a road surface, on the basis of a relationship between the actual speed of the wheel detected by the corresponding wheel speed sensor, and the running speed of the vehicle.

An example of the anti-lock brake control apparatus of the type indicated above is known, for example, as a multiple-mode type as disclosed in laid-open Publication No. 2-129960 of unexamined Japanese Utility Model Application. In the multiple-mode type control apparatus disclosed in this publication, the pressure regulating device having the solenoid-operated pressure regulating valve or valves is operable in different pressure control modes such as a rapid pressure-increase mode, a slow pressure-increase mode, a pressure-hold mode, a rapid pressure-decrease mode and a slow pressure-decrease mode, and the controller estimates the vehicle running speed on the basis of the detected actual speeds of the wheels, at a predetermined cycle time, so that the controller selects one of the pressure control modes that is most suitable for restoring the actual speed of each wheel to a target or desired speed, depending upon the relationship between the estimated vehicle speed and the detected speed of the wheel in question. The controller activates the pressure regulating device in the selected pressure control mode for regulating the braking pressure to be applied to the wheel.

In the known anti-lock brake control apparatus constructed as described above, the running speed of the vehicle is estimated based on the detected speeds of the plurality of wheels, on the assumption that the detected speed of at least one of the wheels is equal to the actual running speed of the vehicle. However, this arrangement does not assure a sufficiently high degree of accuracy in estimating the vehicle speed, since the above assumption is not always true.

The known anti-lock brake control apparatus is also adapted to select one of the plurality of different pressure control modes that permits to establish the most ideal braking pressure gradient, with high precision, for restoring the actual speed of each wheel to its desired or target speed. Since the number of the pressure control modes available is limited, the selected mode is not always most ideal for controlling the gradient along which the braking pressure is regulated. In this sense, too, the known control apparatus is not sufficiently satisfactory in the precision of regulation of the braking pressure for each wheel.

Thus, the known anti-lock brake control apparatus more or less has difficulty in assuring sufficiently high degrees of accuracy in the estimation of the vehicle running speed and in the selection of the pressure control mode. In other words, the known arrangement suffers from an undesirable deviation in the estimated vehicle speed with respect the actual vehicle speed (e.g., ground-speed of the vehicle relative to the road surface), as indicated in the graph of FIG. 24, whereby the braking pressure controlled on the basis of the estimated vehicle speed tends to overshoot, resulting in insufficient precision of control of the braking pressure. Accordingly, the known arrangement also suffers from relatively frequent operations of the solenoid-operated valves, which lead to high levels of operating noise and vibration due to the frequent operations of the valves and the related components.

SUMMARY OF THE INVENTION

It is therefore an object of the present invention to solve the problem discussed above, namely to provide a control apparatus capable of controlling an anti-lock brake system for a vehicle, with sufficiently high accuracy and with reduced operating noise and vibration.

The above object may be accomplished according to the principle of the present invention, which provides a control apparatus for controlling an anti-lock brake system for a vehicle having a plurality of wheel speed sensors for detecting actual speeds of respective wheels of the vehicle, an electrically controlled brake pressure regulating device including at least one solenoid-operated valve for regulating a braking pressure applied to each of the plurality of wheels, and a controller for controlling the pressure regulating device so as to prevent locking of each wheel, on the basis of a relationship between the actual speed of the wheel detected by the corresponding wheel speed sensor, and a running speed of the vehicle, the control apparatus being characterized in that a ground-speed sensor is provided for detecting the running speed of the vehicle in the form of a ground-speed relative to a road surface, and in that the controller controls each of the at least one solenoid-operated solenoid valve at a controlled duty cycle, so as to prevent the locking of each wheel. The controller comprises duty cycle determining means for determining the duty cycle of each solenoid-operated valve, on the basis of at least a wheel speed error and a time derivative of the wheel speed error. The wheel speed error is defined as a deviation of the actual speed of the wheel detected by the corresponding wheel speed sensor, from a target wheel speed obtained on the basis of the ground-speed of the vehicle detected by the ground-speed sensor.

In the anti-lock brake control apparatus of the present invention constructed as described above, the actual speed of each wheel is detected by the appropriate wheel speed sensor, while the ground-speed of the vehicle is detected by the ground-speed sensor. The duty cycle of the solenoid-operated valve for that wheel is controlled by the controller, so as to prevent the locking of the wheel, on the basis of at least the wheel speed error (deviation of the detected actual wheel speed from the detected actual ground-speed of the vehicle)

and the time derivative of the wheel speed error. This arrangement permits the wheel speed to accurately follow the target speed, owing to a synergistic effect which results from improved accuracy of detection of the vehicle speed as the ground-speed detected by the ground-speed sensor, and smooth and precise control of the braking pressure by controlling the duty cycle of the solenoid-operated pressure regulating valve. Accordingly, the present duty cycle control arrangement utilizing the detected vehicle ground-speed assures accurate control of the braking pressure, without unnecessary activation of the solenoid-operated valve and with reduced operating noise and vibration of the valve.

The wheel speed error may be represented for reflected by an error or deviation of an actual slip ratio of the wheel from a target slip ratio, or other parameter associated with the deviation of the actual wheel speed from the target wheel speed. Further, the time derivative of the wheel speed error may be represented by a time derivative of the error of the actual slip ratio from the target slip ratio, or other parameter which varies with the parameter which reflects the wheel speed error. The time derivative of the wheel speed error may be replaced by a time derivative of the detected actual wheel speed, i.e., wheel deceleration.

The pressure regulating device may be essentially constituted by a combination of a pressure-increase valve and a pressure-decrease valve, or a three-position valve which has a pressure-increase position, a pressure-decrease position and a pressure-hold position, in which the braking pressures to be applied to the wheels are increased, decreased and held unchanged, respectively.

The duty cycle determining means of the controller may be adapted to determine the duty cycle on the basis of the ground-speed of the vehicle, as well as on the basis of the wheel speed error and the time derivative of the wheel speed error. This arrangement, which assures optimum control of the wheel speed during the initial period of the anti-lock pressure control operation, is based on a fact that the ease of control of the wheel speed differs depending on the vehicle ground-speed, namely, depending on whether the vehicle ground-speed is relatively high or low.

The duty cycle determining means may also be adapted to determine the duty cycle on the basis of at least a rate of increase in a slip amount of the wheel, during an initial period immediately after the commencement of an anti-lock brake pressure control operation of each solenoid-operated valve at the controlled duty cycle. This arrangement, which assures optimum control of the wheel speed during the initial period of the anti-lock pressure control operation, is based on a fact that the ease of control of the wheel speed differs depending upon whether the rate of increase in the wheel slip amount is relatively high or low. The duty cycle determining means may be adapted to determine not only the slip amount of the wheel, but also at least one of the wheel speed error and the time derivative thereof.

The rate of increase in the wheel slip amount means the rate of increase in the actual slip ratio of the wheel, for a specific relationship between the force acting on the brake operating member such as a brake pedal, and the coefficient of friction between the wheel and the road surface. In this sense, it is desirable that the rate of increase in the wheel slip amount be obtained as a parameter which accurately reflects the relationship among the actual slip ratio, brake operating force and coefficient of friction, for instance, as a time derivative of an error or deviation of the actual wheel speed from the target wheel speed during the initial period of the anti-lock pressure control operation. However, the rate of increase in the wheel slip amount during the initial period of the anti-lock pressure control operation may be represented by the friction coefficient, which reflects the time derivative of the actual wheel speed, i.e., the wheel deceleration.

The initial period of the anti-lock pressure control operation may be interpreted to mean the very first control cycle performed immediately after the determination that the braking pressure applied to the wheel should be regulated so as to prevent the locking of the, wheel. Alternatively, the initial period may be interpreted to mean the two or more successive control cycles which include the first control cycle.

The ground-speed sensor may be a Doppler-effect type sensor as disclosed in laid-open Publication NO. 63-64861, which includes (a) a transmitter attached to a body of the vehicle and transmitting a detecting wave toward the road surface in a predetermined direction of propagation, (b) a receiver attached to the vehicle body and receiving a portion of the wave which is irregularly reflected by the road surface, and (c) a signal processor which provides an output representative of the ground-speed of the vehicle, on the basis of the frequency of the wave transmitted by the transmitter and the frequency of the portion of the wave received by the receiver. The optical axis of the Doppler-effect ground-speed sensor may be inclined in one of the opposite running directions of the vehicle, namely, either in the forward running direction of the vehicle, or in the reverse or backward running direction.

Preferably, the receiver of the sensor is spaced apart from the transmitter thereof in one of the opposite running directions of the vehicle in which the direction of propagation of the detecting wave from the transmitter toward the road surface is inclined with respect to the downward direction perpendicular to the running directions. If the direction of propagation of the wave is inclined in the forward running direction, the receiver is spaced apart from the transmitter in the forward running direction. If the direction of the wave propagation is inclined in the backward running direction, the receiver is spaced apart from the transmitter in the backward running direction.

The above arrangement of the Doppler-effect ground-speed sensor is advantageous over the known sensor in which the optical axes of the transmitter and receiver are aligned with each other and are parallel to the direction perpendicular to the running directions of the vehicle. According to this arrangement, the irregularly reflected wave received by the receiver is more similar to the wave regularly reflected by the road surface, than in the known sensor. In other words, the intensity of the irregularly reflected wave received by the receiver of the present sensor is higher than that received by the receiver of the known sensor. Thus, the frequency of the wave received by the receiver of the present sensor more accurately reflects the running speed of the vehicle. That is, the output of the receiver is less likely to be subject to a conventional drawback that the intensity of the received wave decreases with an increase in the vehicle speed. Accordingly, the error in the output of the receiver is reduced, whereby the error or variation in the frequency output of the signal processor is consequently reduced, assuring a reduced amount of error in the ground-speed of the vehicle as detected by the ground-speed sensor.

The above drawback of the prior art sensor solved by the preferred arrangement of the Doppler-effect ground-speed sensor is derived from the fact that the velocity of flow of an air stream between the transmitter of the sensor and the road surface increases with an increase in the running speed of the vehicle, and that the tendency of scattering of the wave propagating through the air stream increases with an increase in the air flow velocity, whereby the intensity of the wave received by the receiver decreases with the vehicle running speed. Further, the drawback arises from the fact that the movement of the receiver with the vehicle causes a decrease in the intensity of the received wave when the sensor axis is inclined in the backward or reverse running direction.

The spaced-apart relation of the receiver relative to the transmitter according to the preferred arrangement of the Doppler-effect ground-speed sensor is substantially free from the influence of the velocity of the air stream between the sensor and the road surface and the influence of the vehicle speed.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
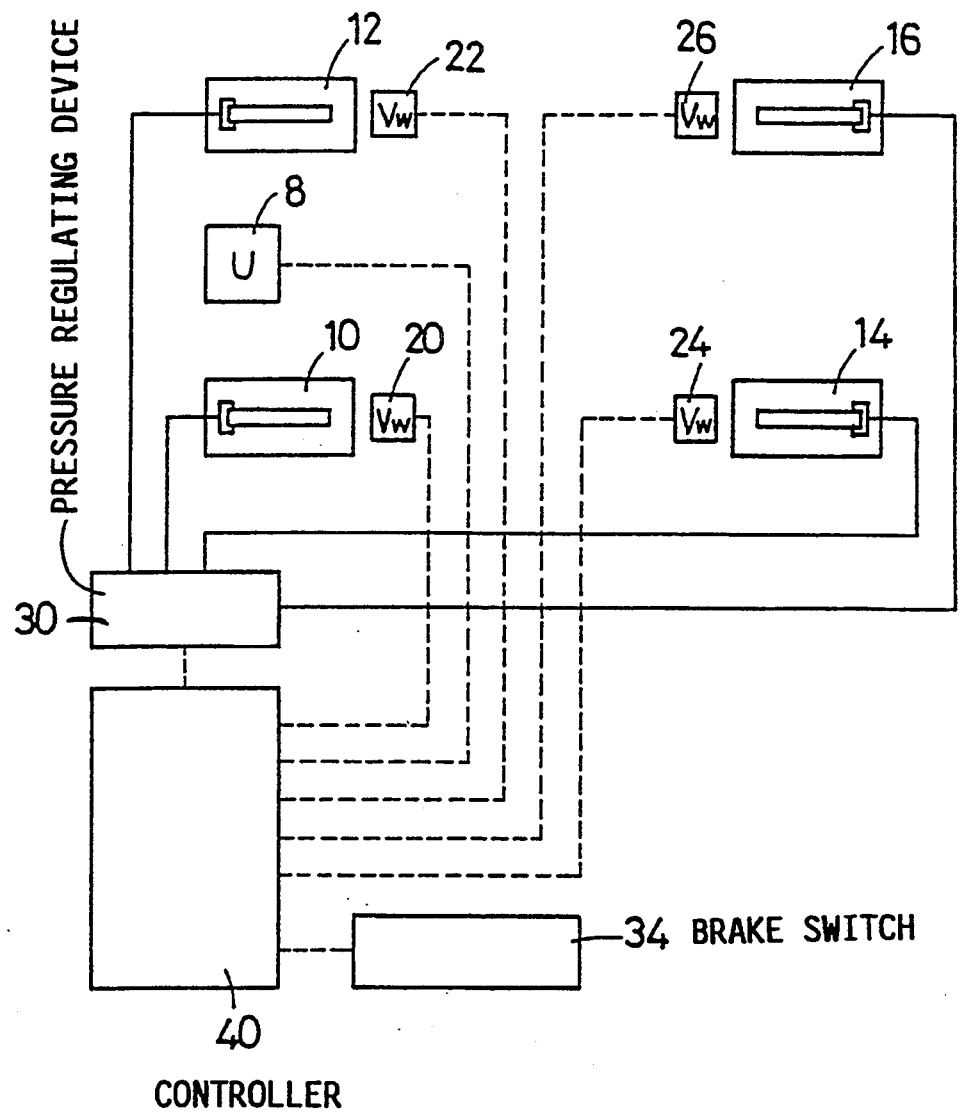
FIG. 1 is a block diagram illustrating a general arrangement of an anti-lock brake system for a motor vehicle, equipped with a control apparatus constructed according to one embodiment of the present invention.

Referring first to FIG. 1 showing one embodiment of a control apparatus of this invention for controlling an anti-lock or anti-skid brake system, the control apparatus includes a ground-speed sensor 8 is provided for detecting a ground-speed U of the vehicle, namely, a running speed of the vehicle relative to the road surface. The control apparatus further includes four wheel speed sensors: front wheel-speed sensors 20, 22 for detecting the actual speeds vw of left and right front wheels 10, 12 of the vehicle, respectively; and rear wheel-speed sensors 24, 26 for detecting the actual speeds Vw of left and right rear wheels 14, 16, respectively. The control apparatus also includes a pressure regulating device 30, and a controller 40. The pressure regulating device 20 is adapted to regulate the braking pressures applied to the four wheels 10–16. In this embodiment, the pressure regulating device 30 has four solenoid-operated pressure regulating valves for the respective four wheels 10–16. In operation, the controller 40 controls the duty cycle of each solenoid-operated valve to regulate the braking pressure applied to the corresponding wheel, on the basis of the output signals from the ground-speed sensor 8 and wheel speed sensors 20–26, and an output signal from a brake switch 34, as described below. The output of the brake switch 34 indicates an operation of a brake pedal or other brake operating member by the vehicle driver.

Figure 2:
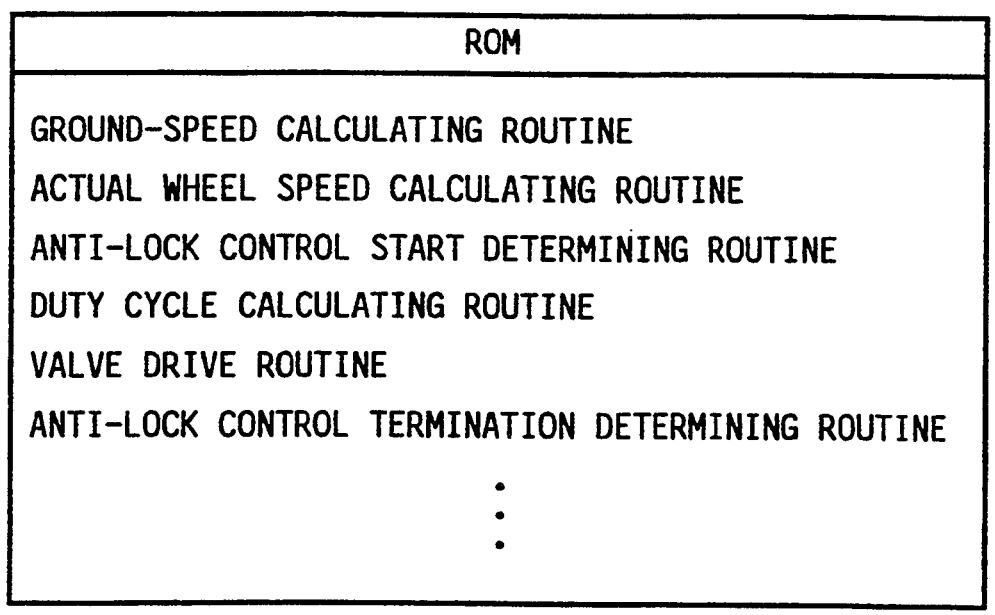
FIG. 2 is a view indicating various control routines stored in a read-only memory of a computer of a controller used for the control apparatus of FIG. 1.

The controller 40 is constituted essentially of a computer incorporating a central processing unit (CPU), a read-only memory (ROM), a random-access memory (RAM) and a bus interconnecting these elements CPU, ROM and RAM. The ROM stores various control programs as indicated in FIG. 2, such as: ground-speed calculating routine; an actual wheel speed calculating routine; anti- lock control start determining routine; duty cycle calculating routine; valve drive routine; and anti-lock control termination determining routine.

Figure 3:
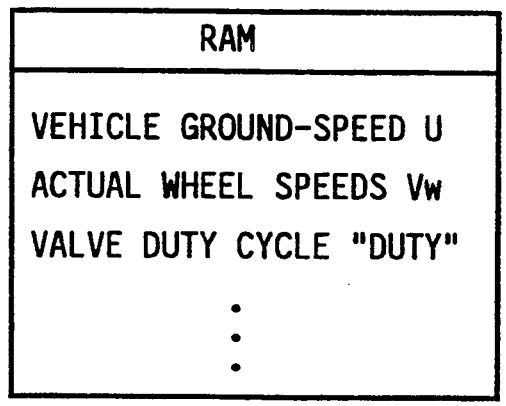
FIG. 3 is a view indicating information stored in a random-access memory of the computer.

The CPU of the controller 40 executes the ground-speed calculating routine and actual wheel speed calculating routine, at a predetermined time interval (cycle time), to calculate the ground-speed U of the vehicle from the output of the ground-speed sensor 8, and the actual speeds Vw of the vehicle wheels 10–16 from the outputs of the wheel speed sensors 20–26. The calculated vehicle ground-speed U and the calculated actual speeds Vw of the wheels 10–16 are stored in the RAM of the controller 40, as indicated in FIG. 3.

The CPU also executes the anti-lock control start determining routine at a predetermined time interval, to determine whether the braking pressure applied to each wheel should be controlled in the anti-lock manner. Described more specifically, this routine includes a step of determining whether the brake pedal is in an operated state or not, based on the output signal received from the brake switch 34, a step of determining whether each wheel 10–16 has an excessive amount of slip or not, if the brake pedal is in the operated state. If any one of the wheels 10–16 has an excessive amount of slip, the CPU determines that an anti-lock pressure control operation should be started to regulate the braking pressure applied to this wheel. For each wheel whose slip amount is determined to be excessive, the CPU of the controller 40 executes the duty cycle calculating routine, valve drive routine and anti-lock control termination determining routine, in the order of description. These routines are executed at a predetermined cycle time T, for example, 50 msec. For the wheels whose slip amounts are determined to be smaller than an upper limit, the anti-lock control start determining routine is again executed.

Figure 4:
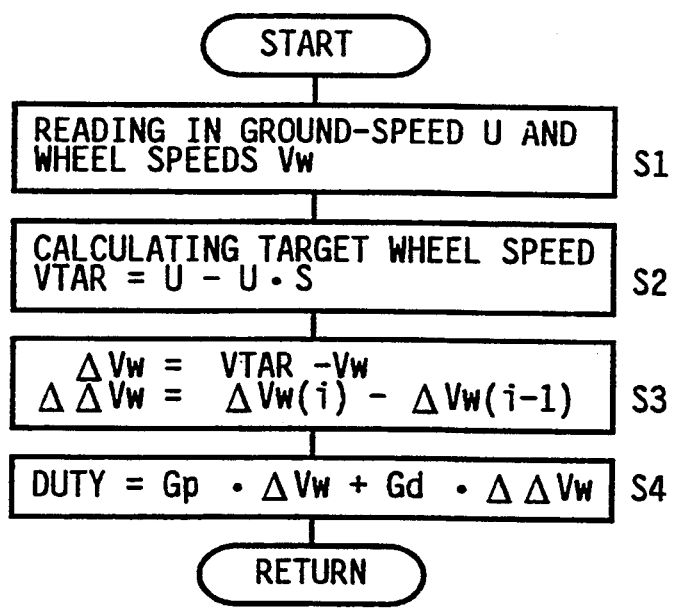
FIG. 4 is a flow chart illustrating a routine for calculating the duty cycle of a pressure regulating valve for controlling braking pressure applied to each wheel of the vehicle, in the embodiment of FIG. 1.

The duty cycle calculating routine is illustrated in FIG. 4. Initially, step S1 is implemented to read in the vehicle ground-speed U and the wheel speeds Vw, from the RAM of the controller 40. Step S1 is followed by step S2 in which a desired or target wheel speed VTAR is calculated by subtracting from the detected vehicle ground-speed U, a product of the ground speed U and a desired wheel slip ratio S which is a constant common to the front wheels 10, 12 and the rear wheels 14, 16.

Figure 5:
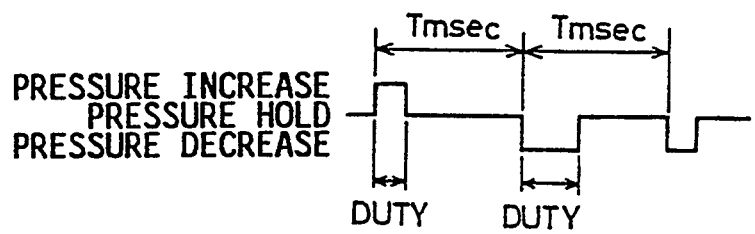
FIG. 5 is a graph for explaining the duty cycle of the valve in the embodiment of FIG. 1.

Subsequently, step S3 is implemented to calculate a wheel speed error $\Delta Vw$, by subtracting the detected actual speed Vw of each wheel from the calculated target speed VTAR. Further, in step S3, a derivative $\Delta\Delta Vw$ of the wheel speed error $\Delta Vw$ is calculated by subtracting the wheel speed error $\Delta Vw(i-1)$ in the last control cycle from the wheel speed error $\Delta Vw(i)$ in the present control cycle. This derivative $\Delta\Delta Vw$ represents a rate of change in the wheel speed error $\Delta Vw$ during the time period equal to the cycle time, and is therefore a time derivative of the wheel speed error $\Delta Vw$. Then, the control flow goes to step S4 to calculate the duty factor or duty cycle DUTY of the solenoid-operated pressure regulating valve in question. This calculation is effected by adding a product of the wheel speed error $\Delta Vw$ and a proportional control gain Gp, to a product of the time derivative $\Delta\Delta Vw$ of the wheel speed error and a derivative control gain Gd. The duty cycle DUTY is a ratio or percentage of the pressure-increase or pressure-decrease time with respect to the total cycle time T (msec), as indicated in FIG. 5. The total cycle time T consists of the pressure-increase or-decrease time and the pressure-hold time. The duty cycle is a negative value when the solenoid-operated value is operated to increase the braking pressure, and a positive value when the valve is operated to lower the braking pressure. The calculated duty cycle is stored in the RAM of FIG. 3. The duty cycle calculating routine of FIG. 4 is repeated at the predetermined cycle time T.

Then, the CPU of the controller 40 executes the valve drive routine and the anti-lock control termination determining routine. The valve drive routine is a routine for energizing the solenoid coil of each solenoid-operated valve of the pressure regulating device 30, according to the duty cycle stored in the RAM for each wheel. The anti-lock control termination determining routine is a routine for determining whether the anti-lock pressure control operation initiated according to the determination in the anti-lock control start determining routine should be terminated or not. More specifically, the anti-lock control termination determining routine includes a step of determining whether or not the brake switch 34 has been turned off as a result of a release of the brake pedal. If the brake switch 34 has been turned off, the CPU determines that the anti-lock pressure control operation should be terminated. If the brake switch is still in the operated or "on" state, the anti-lock pressure control operation is continued unless the following condition to terminate this operation is satisfied. This anti-lock control terminating condition is satisfied if the detected actual speed Vw of the wheel 10–16 in question is close to the detected vehicle ground-speed U, with the speed difference (Vw−U) being less than $\pm 1$ km/h), and if the pressure-increase time (time during which the duty cycle is negative) lasts for more than a predetermined time (more than 1 second). If the anti-lock control terminating condition is not satisfied for the wheel in question, the duty cycle calculating routine is repeated. If the anti-lock control terminating condition is satisfied, (1) the anti-lock pressure control operation is terminated for the wheel, (2) the corresponding solenoid-operated valve is commanded to increase the braking pressure, and (3) the anti-lock control start determining routine is executed to start an anti-lock pressure control operation again if the amount of slip of the wheel in question becomes excessive.

In the present anti-lock brake control apparatus, the duty cycle of the pressure regulating device is controlled on the basis of the vehicle ground-speed U which is accurately detected by the ground-speed sensor, so that the actual speed Vw of each wheel accurately follows the target value VTAR which is determined by the detected vehicle ground-speed U. Thus, the present control apparatus is capable of controlling the anti-lock brake system with high precision, without an overshoot of the actual wheel speed Vw with respect to the target value VTAR, while eliminating unnecessary frequency operations of the solenoid-operated valve or valves, thereby reducing the operating noise and vibration of the brake system, which may be transmitted to the vehicle driver, via the brake pedal, for example.

While the present embodiment is adapted such that the duty cycle of the pressure regulating device is controlled or changed depending upon the wheel speed error $\Delta Vw$ and the time derivative $\Delta\Delta Vw$ thereof, the duty cycle may be controlled depending upon the wheel speed error $\Delta Vw$, and a time derivative of the actual wheel speed Vw, namely, the wheel deceleration value, for example. In the illustrated embodiment, the duty cycle controlled reflects not only the time derivative of the vehicle ground-speed U, namely, the vehicle deceleration (deceleration of the vehicle body which reflects the operating amount or force of the brake pedal or brake operating member) but also the time derivative of the actual wheel speed Vw, namely, the wheel deceleration. On the other hand, the duty cycle controlled depending upon the wheel speed error $W \propto w$ and the wheel deceleration does not reflect the vehicle deceleration. In this respect, the illustrated embodiment using the wheel speed error $\Delta Vw$ and the time derivative thereof $\Delta\Delta Vw$ assures improved accuracy in controlling the braking pressure so that the actual wheel speed Vw coincides with the target value VTAR.

Although the proportional control gain Gp and the derivative control gain Gd are both common to the front wheels 10, 12 and the rear wheels 14, 16, these two control gains Gp, Gd for the front wheels may be different from those for the rear wheels, in view of the different control characteristics of the front and rear wheels in terms of their speeds Vw.

Figure 6:
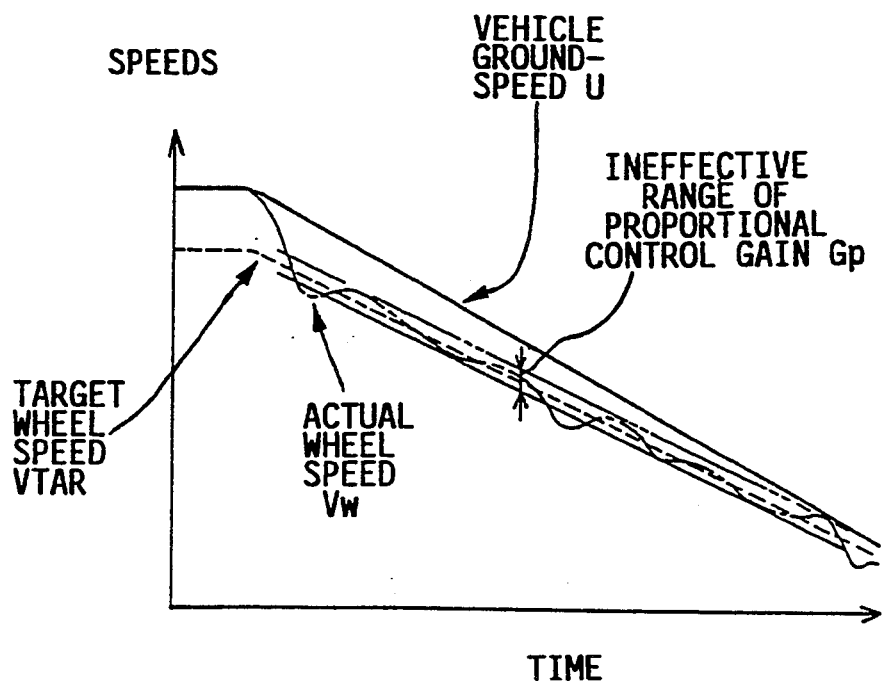
FIG. 6 is a graph indicating changes in the speeds of the vehicle and wheel, when the wheel braking pressure is controlled according to another embodiment of the invention.

In the embodiment of FIG. 4 discussed above, the proportional control gain Gp is a fixed value, irrespective of the wheel speed error $\Delta Vw$. However, the proportional control gain Gp may be zero when the absolute value of the wheel speed error $\Delta Vw$ is equal to a predetermined threshold (e.g., 2 km/h) or smaller, and may be a suitable value other than zero when the absolute value is larger than the threshold. In this modified arrangement wherein the proportional control gain Gp is zeroed when the actual wheel speed Vw is sufficiently close to the target value VTAR, the duty cycle is reduced to zero so as to prolong the pressure-hold time and thereby slowly increase or decrease the braking pressure, as long as the wheel speed error $\Delta Vw$ is relatively small. This arrangement is effective to reduce the pressure pulsation of the brake system due to an abrupt change in the braking pressure. A graph in FIG. 6 illustrates an example of the changes in the actual wheel speed Vw with respect to the target speed VTAR according to this modified embodiment.

In the embodiment of FIG. 4, the target wheel speed VTAR is determined on the basis of the vehicle ground-speed U and the desired wheel slip ratio S, irrespective of whether the ground-speed U is relatively high or low. According to this arrangement, the relatively low ground-speed U may result in a considerably small difference between the detected vehicle ground-speed U and the determined target wheel speed VTAR, which makes it difficult to adequately control the actual wheel speed Vw based on the outputs of the ground-speed sensor 8 and wheel speed sensors 20–26.

Figure 7:
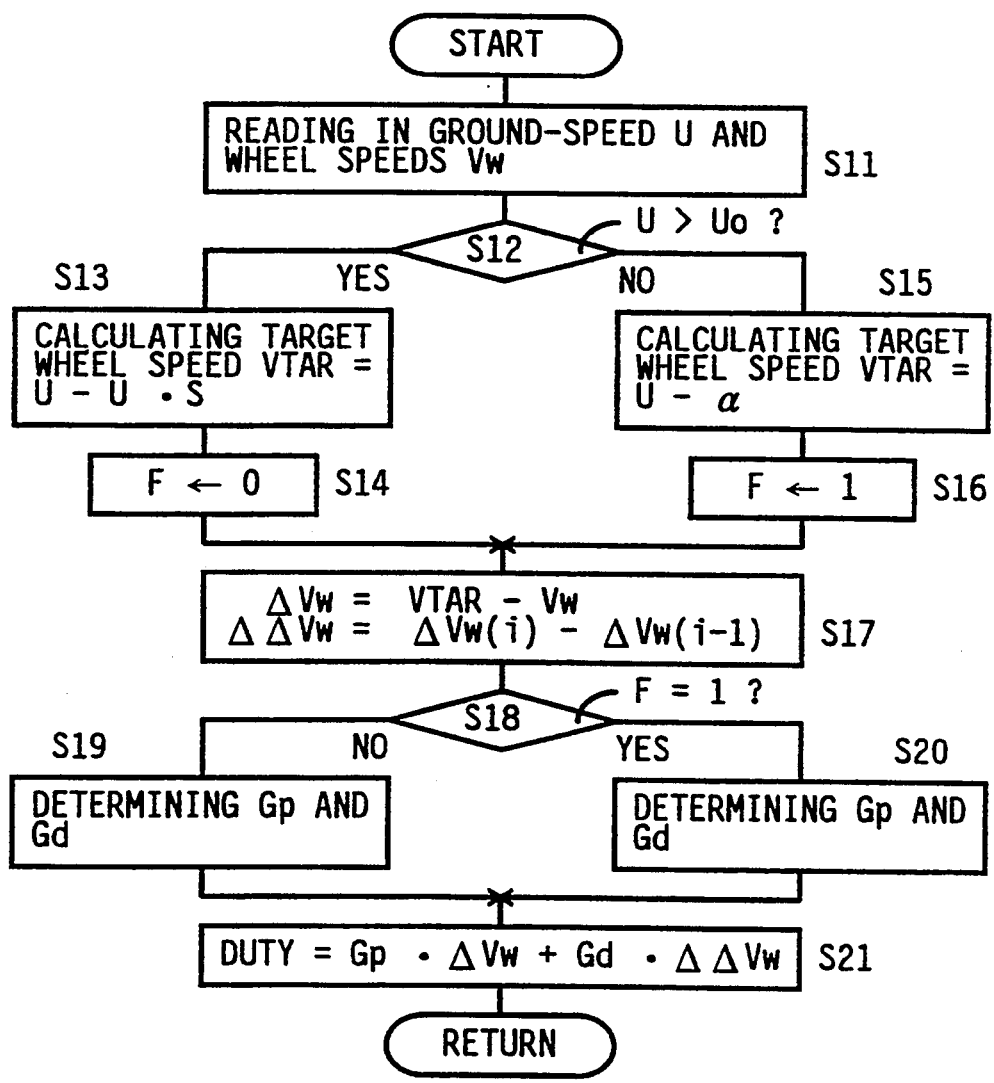
FIG. 7 is a flow chart illustrating the duty cycle calculating routine used in the embodiment of FIG. 6.

The above drawback may be solved according to an embodiment illustrated in the flow chart of FIG. 7. In this embodiment, the duty cycle calculating routine of FIG. 7 is stored in the ROM of the controller 40 (FIG. 1), in place of the routine of FIG. 4. In the other aspects, the embodiment of FIG. 7 is similar to the embodiment of FIGS. 1–5.

Briefly, the embodiment of FIG. 7 is adapted such that the target wheel speed VTAR is obtained from the detected vehicle ground-speed U and the desired wheel slip ratio S as in the embodiment of FIG. 4 (step S2) when the ground-speed U is higher than a predetermined threshold $U_0$, and is obtained by subtracting a suitable compensating value $\alpha$ (e.g., 2 km/h) from the detected ground-speed U when the ground-speed U is equal to or lower than the threshold $U_0$.

Figure 8:
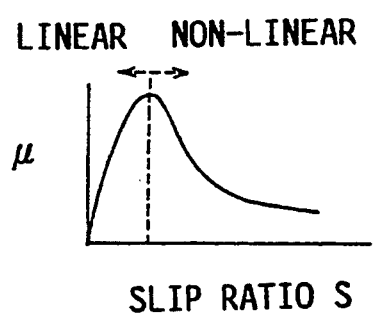
FIG. 8 is a graph showing a relationship between slip ratio S of the wheel and friction coefficient $\mu$ between the road surface and the wheel.
Figure 9:
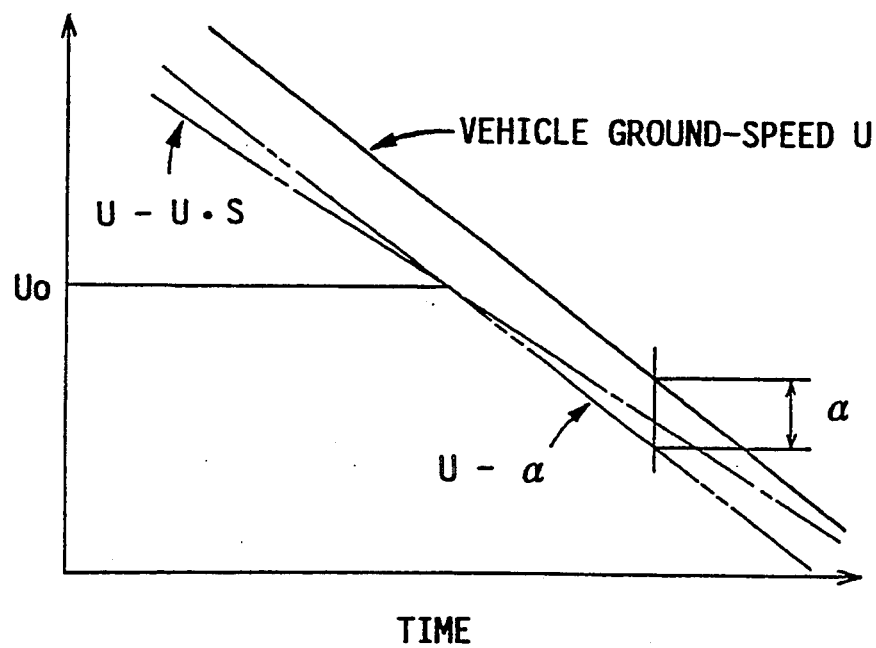
FIG. 9 is a graph for explaining the manner of calculating target wheel speed according to the duty cycle calculating routine of FIG. 7.

In the former case, the wheel slip ratio S (e.g., 10%) where the friction coefficient $\mu$ is maximum as indicated in the graph of FIG. 8 is used as the desired wheel slip ratio to calculate the target wheel speed VTAR. In the latter case, the compensating value $\alpha$ is determined so that the target wheel speed VTAR obtained from the ground-speed U and the desired wheel slip ratio S where the ground-speed U is equal to the threshold $U_0$ is equal to the target wheel speed VTAR which is obtained by subtracting the value $\alpha$ from the ground-speed U ($=U_0$). The graph of FIG. 9 show changes in the target wheel speed values (U−U·S) and (U−$\alpha$) which are determined differently as described above.

Figure 10:
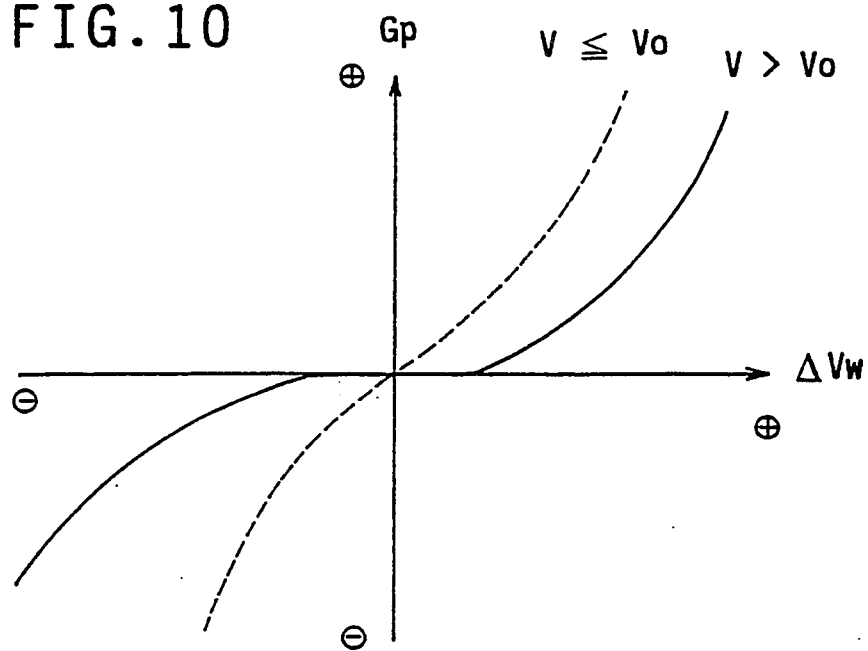
FIG. 10 is a graph showing a relationship among wheel speed error $\Delta Vw$, proportional control gain Gp and vehicle ground-speed U, which relationship is used to determine the proportional control gain Gp in the routine of FIG. 7.
Figure 11:
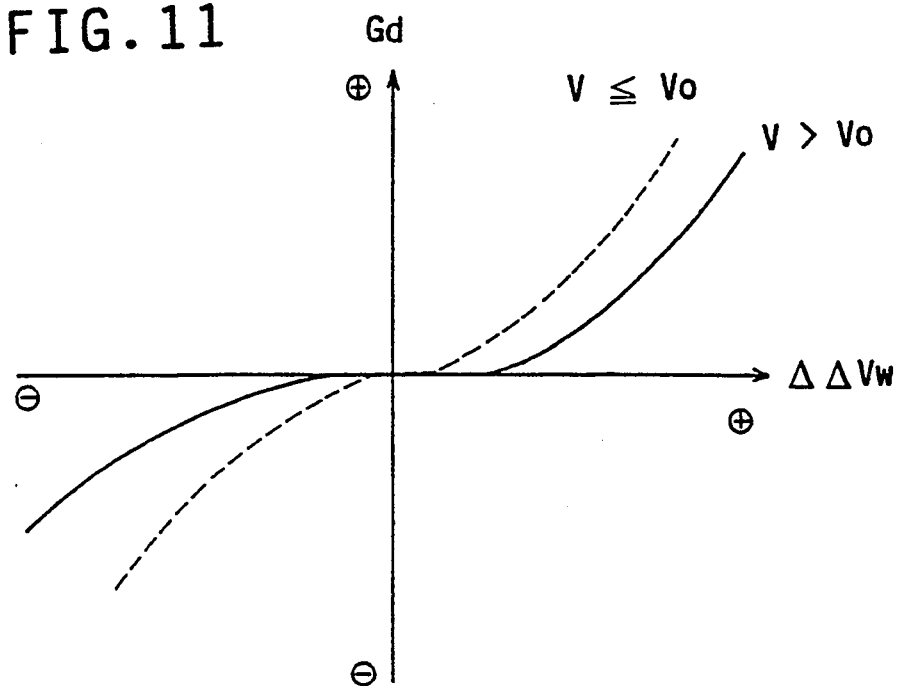
FIG. 11 is a graph showing a relationship among wheel speed error differential $\Delta\Delta Vw$, derivative control gain Gd and vehicle ground-speed U, which relationship is used to determine the derivative control gain Gd in the routine of FIG. 7.

The duty cycle calculating routine illustrated in FIG. 7 is further adapted such that the proportional control gain Gp and the derivative control gain Gd continuously vary with the wheel speed error $\Delta Vw$ and the time derivative $\Delta\Delta Vw$ thereof, respectively, as indicated in solid and dashed lines in the graphs of FIGS. 10 and 11. Further, the proportional control gain Gp and derivative control gain Gd change with $\Delta Vw$ and $\Delta\Delta Vw$, respectively, along different curves depending upon whether or not the ground-speed U is higher than the threshold value $U_0$. In FIGS. 10 and 11, the Gp-$\Delta Vw$ curve and Gd-$\Delta\Delta Vw$ curve for the relatively high ground-speed U ($>U_0$) are indicated by the solid line, while the Gp-$\Delta Vw$ curve and Gd-$\Delta\Delta Vw$ curve for the relatively low ground-speed U ($\leq U_0$) are indicated by the dashed lines. All of these curves (Gp-$\Delta Vw$ relationships and Gd-$\Delta\Delta Vw$ relationships) are stored in the RAM of the controller 40.

It will be understood from the graphs of FIGS. 10 and 11 that the proportional control gain Gp and the derivative control gain Gd are both zeroed when the wheel speed error $\Delta Vw$ or τηε τιμε φεθι×ατι×ε τηεθε°π $\Delta\Delta Vw$ is close to zero, where the vehicle ground-speed U is higher than the threshold $U_0$, and that the gains Gp and Gd are not zeroed, namely, are sensitive to the change in $\Delta Vw$ and $\Delta\Delta Vw$ even when these values $\Delta Vw$ and $\Delta\Delta Vw$ are close to zero, where the ground-speed U is equal to or lower than the threshold $U_0$.

Figure 12:
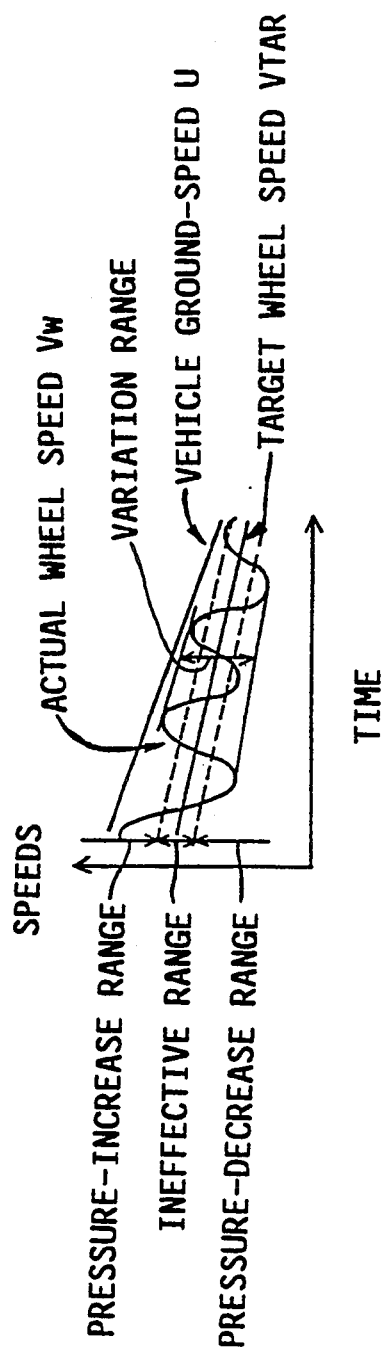
FIG. 12 is a graph for explaining a relationship between variation range of actual wheel speed Vw, and ineffective range of the proportional and derivative control gains Gp, Gd.

Experiments show that when the vehicle ground-speed U is relatively low, the actual speed Vw of the wheel 10–16 varies with respect to the target speed VTAR as a center value, over a considerably wide range, as indicated in the graph of FIG. 12, if the target speed VTAR is the ground-speed U minus the compensating value $\alpha$ and if the proportional control gain Gp is zeroed as in the modified embodiment of FIG. 6 when the absolute wheel speed error $\Delta Vw$ is equal to the threshold or lower. That is, if the target wheel speed VTAR is calculated by subtracting the compensating value $\alpha$ from the ground-speed U, the actual slip ratio Sw of the wheel (10–16) tends to be larger than the target wheel slip ratio S (for the relatively high ground-speed U). In other words, the actual wheel slip ratio Sw varies non-linearly over a range to the right of the peak of the $\mu$-S curve in the graph of FIG. 8. The experiments also show that the range of variation of the actual wheel speed Vw is narrowed with the narrowing of the range of the wheel speed error $\Delta Vw$ in which the proportional control gain Gp is zeroed. For this reason, the gain Gp is not zeroed for the wheel speed error $\Delta Vw$ close to zero, when the ground-speed U is equal to or lower than the threshold $U_0$. For substantially the same reason, the derivative control gain Gd is not zeroed for the wheel speed error $\Delta Vw$ close to zero, when the ground-speed U is equal to $U_0$ or lower.

Referring to the flow chart of FIG. 7, there will be described the duty cycle calculating routine used in the embodiment which has been summarized just above.

The routine of FIG. 7 is started with step S11 to read in the vehicle ground-speed U and the actual speeds Vw of the wheels 10–16. Then, step S12 is implemented to determine whether or not the vehicle ground-speed U is higher than the threshold value $U_0$. If an affirmative decision (YES) is obtained in step S12, the control flow goes to step S13 in which the target wheel speed VTAR is calculated by subtracting a product of the ground-speed U and the desired wheel slip ratio S, from the ground-speed U. Step S13 is followed by step S14 to set a flag F to "0", which means that the vehicle ground-speed U is currently higher than the threshold value $U_0$. If the vehicle ground-speed U is equal to or lower than the threshold value $U_0$, a negative decision (NO) is obtained in step S12, and the control flow goes to step S15 in which the target wheel speed VTAR is calculated by subtracting the predetermined compensating value $\alpha$ from the ground-speed U. Step S15 is followed by step S16 to set the flag F to "1", which means that the ground-speed U is currently equal to or lower than the threshold value.

Steps S14 and S16 are followed by step S17 to calculate the wheel speed error $\Delta Vw$ and the time derivative $\Delta \dot Vw$ thereof for each wheel, as in step S3 of the embodiment of FIG. 4. Then, the control flow goes to step S18 to determine whether or not the flag F is set at "1", that is whether or not the current vehicle ground-speed U is higher than the threshold value $U_0$. If the ground-speed U is higher than the threshold value $U_0$, a negative decision (NO) is obtained in step S18, and step S19 is implemented to determine the proportional and derivative control gains Gp and Gd, according to the Gp-$\Delta Vw$ curve (relationship) and the Gd-$\Delta \dot Vw$ curve (relationship) indicated by the solid lines in FIGS. 10 and 11, and depending upon the values $\Delta Vw$ and $\Delta \dot Vw$. If the ground-speed U is equal to or lower than the threshold value $U_0$, an affirmative decision (YES) is obtained in step S18, and step S20 is implemented to determine the proportional and derivative control gains Gp and Gd, according to the curves (relationships) indicated by the dashed lines in FIGS. 10 and 11.

Steps S19 and S20 are followed by step S21 in which the duty cycle DUTY of the pressure regulating device 30 for each wheel is calculated on the basis of the wheel speed error $\Delta Vw$, proportional control gain Gp, time derivative $\Delta \dot Vw$ of the wheel speed error and derivative control gain Gd, in the same manner as in step S4 of FIG. 4. The calculated duty cycles of the wheels 10–16 are stored in the RAM of the controller 40.

In the embodiments described above, the same desired wheel slip ratio S is used for the front wheels 10, 12 and the rear wheels 14, 16. However, the desired slip ratio S of the front wheels 10, 12 may be different from that of the rear wheels 14, 16. For instance, the desired slip ratio S for the front wheels 10, 12 is set at 10% corresponding to the peak of the $\mu$-S curve of FIG. 8, so as to maximize the braking force applied to the front wheels 10, 12 in order to minimize the required braking distance of the vehicle, while the desired slip ratio S for the rear wheels 14, 16 is set at 5% corresponding to a point lower than the peak of the $\mu$-S curve, so as to increase the lateral force of the rear wheels 14, 16 in order to improve the steering stability of the vehicle.

There is known a so-called "selectro-control" for regulating the braking pressures applied to right and left wheels of a motor vehicle for improving the running and steering stability of the vehicle when the road surfaces on which the right and left wheels are running have different coefficients of friction. Usually, this "selectro-control" is limited to the right and left rear wheels 14, 16. More specifically, the anti- lock pressure control operation suitable for one of the right and left rear wheels 14, 16 is also effected for the other rear wheel 14, 16. When the "selectro-control" is applied to the multiple-mode type brake control apparatus, appropriate pressure control modes are initially tentatively selected for the right and left rear wheels, depending on the actual speeds and acceleration values of these wheels. During the pressure control operations of the right and left rear wheels in the respective different tentative modes, one of the modes which has caused a lower braking pressure is eventually selected as an optimum control mode common to the two rear wheels 14, 16. Namely, the rear wheel whose braking pressure is lower than the other rear wheel is selected as a reference wheel, and the pressure control mode tentatively selected for this reference wheel is eventually selected as the optimum pressure control mode for the two rear wheels. However, this "selectro-control" arrangement does not take the vehicle ground-speed into consideration when the reference rear wheel or the common optimum control mode is eventually selected. Thus, the selected common optimum control mode does not accurately reflect the rotating condition of the wheels 14, 16, that is, the coefficients of friction between the road surfaces and the wheels 14, 16. Thus, the selected common control mode is not always optimum.

The above problem may be solved according to a further embodiment of this invention. In this embodiment, the ROM of the controller 40 stores a duty cycle calculating routine for the front wheels 10, 12, which is similar to that illustrated in FIG. 4 or 7, and a duty cycle calculating routine for the rear wheels 14, 16 as illustrated in the flow chart of FIG. 13.

There will be described the rear wheel duty cycle calculating routine which will be executed when the anti-lock control start determining routine indicated above determines that the anti-lock pressure control operation should be effected for the rear wheel or wheels 14, 16. This rear wheel duty cycle calculating routine is also executed with a predetermined cycle time. The routine is started with step S21 to determine whether the braking pressure to be controlled is the right rear wheel 16 or not. If an affirmative decision (YES) is obtained in step S21, step S22 is implemented to read in the actual speed Vwrr of the right rear wheel 16 from the RAM of the controller 40. If a negative decision (NO) is obtained in step S21, step S23 is implemented to read in the actual speed Vwlr of the left rear wheel 14.

Then, the control flow goes to step S24 to determine whether or not the actual speed Vwrr of the right rear wheel 16 is higher than the actual speed Vwlr of the left rear wheel 14. If an affirmative decision (YES) is obtained in step S24, step S25 is implemented to select the left rear wheel 14 as the reference wheel for the "selectro-control". If a negative decision (NO) is obtained in step S24, the control flow goes to step S26 to select the right rear wheel 16 as the reference wheel.

Steps S25 and S26 are followed by step S27 to read in the vehicle ground-speed U from the RAM. Step S27 is followed by step S28 to calculate the target wheel speed VTAR on the basis of the ground-speed U and the desired wheel slip ratio S. Then, step S29 is implemented to calculate the wheel speed error $\Delta$Vw by subtracting the actual speed Vw* of the reference rear wheel from the target wheel speed VTAR. Then, the time derivative $\Delta\Delta$Vw of the wheel speed error $\Delta$Vw is calculated also in step S29 as in the preceding embodiments of FIGS. 4 and 7. Step S30 is then implemented to calculate the duty cycle DUTY, which is a sum of the product of the proportional control gain Gp and the wheel speed error $\Delta$Vw, and the product of the derivative control gain Gd and the time derivative $\Delta\Delta$Vw of the wheel speed error $\Delta$Vw.

Figure 13:
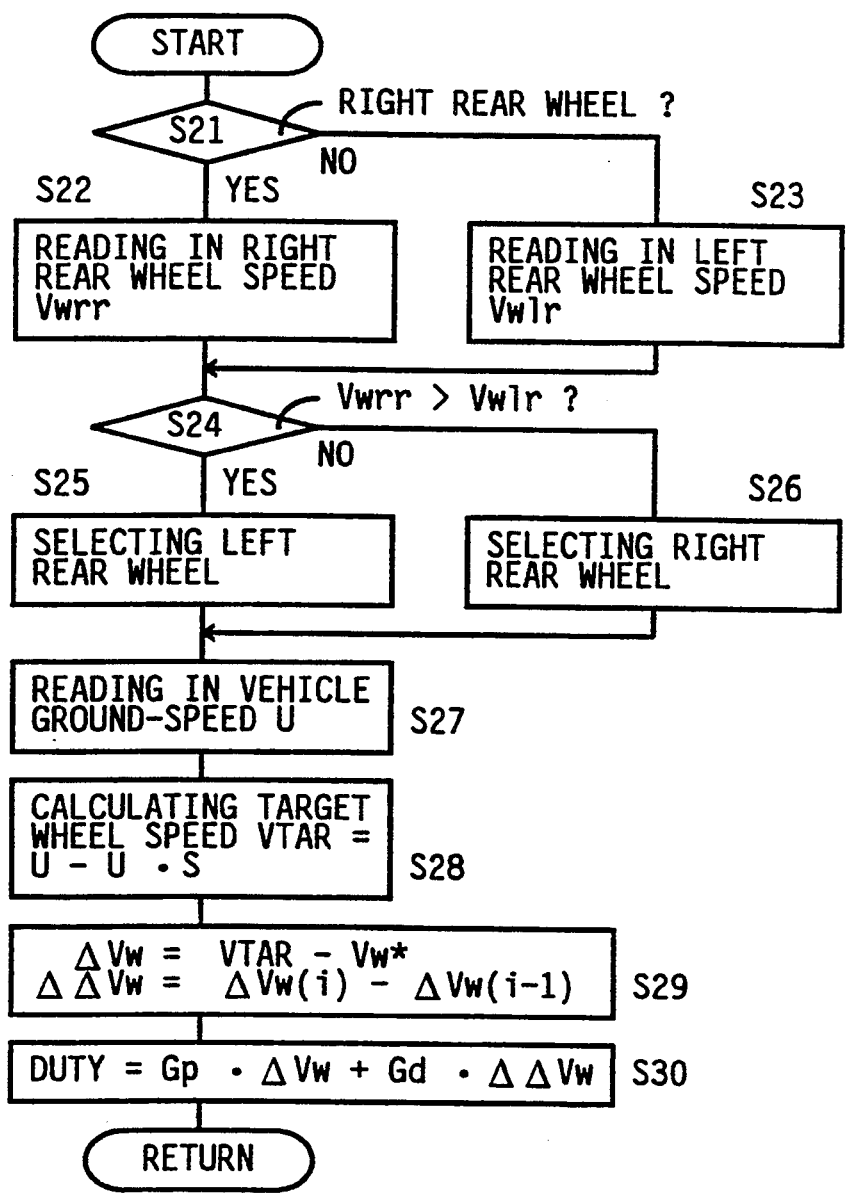
FIG. 13 is a flow chart illustrating the duty cycle calculating routine for the rear wheels, used by a control apparatus according to a further embodiment of this invention.

In the present embodiment, one of the left and right wheels 14, 16 whose actual speed Vw is lower is selected as the reference wheel in each cycle (cycle time=T) of execution of the routine of FIG. 13. Therefore, the reference wheel once selected in a given cycle remains to be the reference wheel even if the actual speed Vw of that rear wheel becomes lower than that of the other rear wheel at a given point of time during the execution of that cycle. This means that the selected reference wheel is not suitable during a period between that point of time and the end of the cycle. This problem may be solved by updating the reference wheel at a time interval t which is shorter than the cycle time T of a routine (S27–S30) for calculating the duty cycle DUTY, so that the cycle time calculating routine is always effected based on a lower one of the actual speeds Vw of the rear wheels 14, 16.

In the several embodiments explained above, the proportional control gain Gp and the derivative control gain Gd are constants, which are used throughout the entire period of the anti-lock pressure control operation (in all cycles of execution of the routine of FIG. 13). Further, these gains Gp and Gd are determined in view of the general wheel locking tendency or rate of increase in the slip amount of the wheels 10–16 on an asphalt pavement or other road surface having a high friction coefficient. For improving the response of the actual wheel speeds Vw to the target wheel speed VTAR, it is important to minimize the amount of drop of the wheel speeds Vw in an initial period of the anti-lock pressure control operation. In this respect, the above embodiments which use the same control gains Gp and Gd throughout the anti-lock pressure control operation suffer from a high risk of considerable drop of the actual wheel speeds Vw, in the initial period of the anti-lock pressure control operation, particularly when the road surface has a low friction coefficient, as in the case where the road surface is covered by a layer of compacted snow, since the gains Gp and Gd are determined based on the general wheel locking tendency.

The above problem may be solved according to a still further embodiment of this invention, which will be described.

This embodiment is adapted such that the derivative control gain Gd used in the first one of the anti-lock pressure control cycles is changed in response to a change in the time derivative $\Delta\Delta$Vw of the wheel speed error $\Delta$Vw, as indicated by solid line in FIG. 14, so that the duty cycle DUTY is more sensitive to responsive to the change in the time derivative $\Delta\Delta$Vw in the first control cycle, than in the following control cycles. Further, the duty cycle DUTY is calculated in the first control cycle, as a product of the thus determined derivative control gain Gd and the time derivative $\Delta\Delta$Vw. For the following control cycles, the derivative control gain Gd is constant irrespective of the change in the time derivative $\Delta\Delta$Vw, as indicated by broken line in FIG. 14. This gain Gd is determined based on the general locking tendency of the wheels as described above. In the control cycles following the first control cycle, the duty cycle DUTY is obtained as in the preceding embodiments, by calculating a sum of the product of the proportional gain Gp and the wheel speed error $\Delta$Vw, and the product of the derivative control gain Gp and the time derivative $\Delta\Delta$Vw of the wheel speed error $\Delta$Vw.

According to the present embodiment, the duty cycle DUTY is determined in the first control cycle, solely on the basis of the product of the time derivative $\Delta\Delta$Vw which reflects the rate of increase in the wheel slip amount, and the derivative control gain Gd which increases with the time derivative $\Delta\Delta$Vw. As indicated in the graph of FIG. 14, the derivative control gain Gd used in the first control cycle is larger than that used in the subsequent control cycles, when the time derivative $\Delta\Delta$Vw (rate of increase in the wheel speed error $\Delta$Vw) is relatively large.

Figure 14:
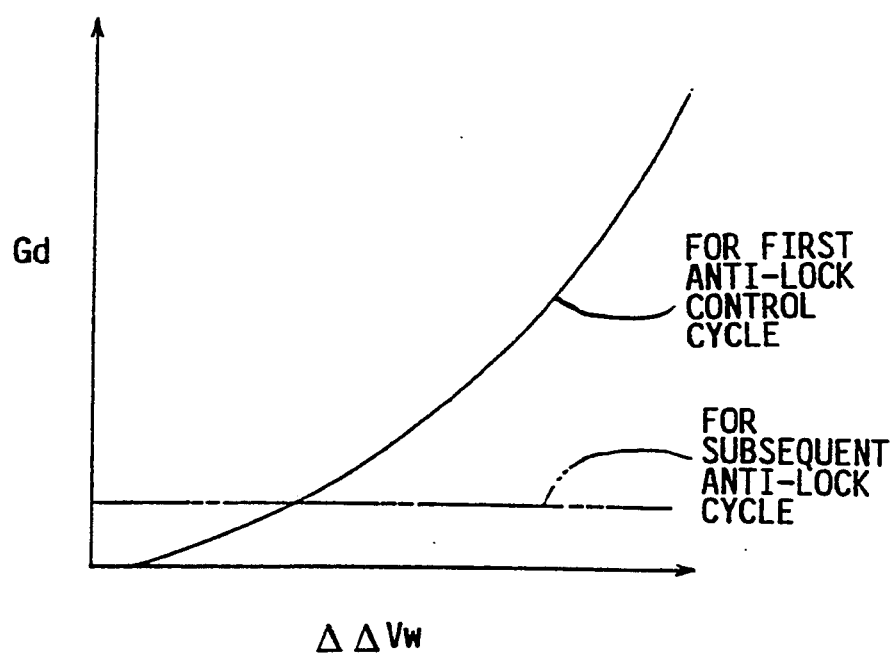
FIG. 14 is a graph indicating to different relationships between the wheel speed error differential $\Delta\Delta Vw$ and the derivative control gain Gd, used for the first and subsequent anti-lock control cycles, according to a still further embodiment of the invention.
Figure 15:
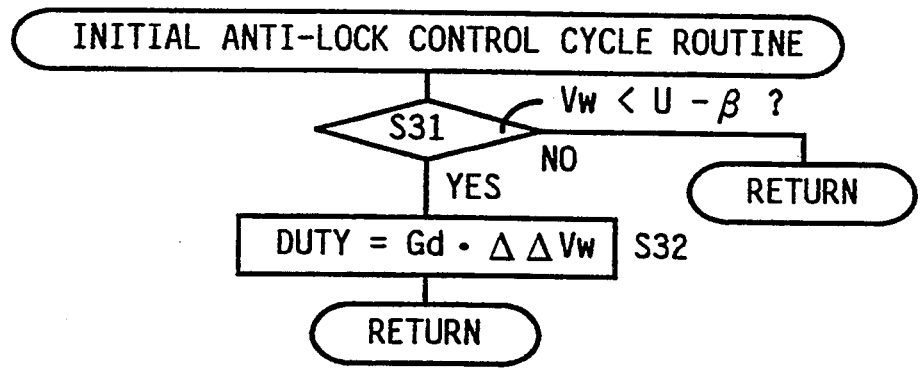
FIG. 15 is a flow chart showing an initial anti-lock control cycle routine used in the embodiment of FIG. 14.

In the present embodiment, the ROM of the controller 40 stores the Gd-$\Delta\Delta$Vw curve or relationship indicated by the solid line in FIG. 14, and an initial anti-lock control cycle routine as shown in the flow chart of FIG. 15. This routine is adapted to determine whether or not an anti-lock pressure control operation should be started, and if so, calculate the duty cycle DUTY in the first control cycle. Thus, the initial anti-lock control cycle routine includes the anti-lock control start determining routine. The ROM also stores a duty cycle control routine for calculating the duty cycle in the following control cycles, which is similar to those used in the embodiments of FIGS. 4, 7 and 13.

In the initial anti-lock control cycle routine of FIG. 15, step S31 is initially implemented to determine whether the actual speed Vw of each wheel is lower than a threshold value (U−$\beta$), namely, the vehicle ground-speed U minus a predetermined value $\beta$. If a negative decision (NO) is obtained in step S31, this means that it is not necessary to start an anti-lock pressure control operation for this wheel. In this case, step S31 is repeated.

If an affirmative decision (YES) is obtained in step S31, this means that it is necessary to start an anti-lock pressure control operation for the wheel in question. In this case, step S32 is implemented to calculate the time derivative $\Delta\Delta$Vw of the wheel speed error $\Delta$Vw, determine the derivative control gain Gd corresponding to the calculated time derivative $\Delta\Delta Vw$, according to the stored Gd-$\Delta\Delta Vw$ relationship for the first control cycle, and finally calculate the duty cycle DUTY, that is, the product of the determined derivative control gain Gd and the time derivative $\Delta\Delta Vw$. The CPU of the controller 40 then activates the appropriate solenoid-operated pressure regulating valve at the calculated duty cycle, so as to minimize the amount of reduction in the actual wheel speed Vw in the initial period of the anti-lock pressure control operation, irrespective of whether the friction coefficient $\mu$ of the road surface is high or low.

While the embodiment of FIG. 15 is adapted such that the anti-lock pressure control operation is started when the wheel speed Vw becomes lower than the threshold value (U−$\beta$), the condition used in step S31 to start the anti-lock pressure control operation may be replaced by other conditions. That is, step S31 may be replaced by step S41 shown in FIG. 16, which is adapted to determine whether or the actual speed Vw of the wheel 10–16 is lower than the target wheel speed VTAR, or by step S52 shown in FIG. 17, which is adapted to determine whether or not the wheel speed Vw is lower than a threshold value (U−U·Ss), which is equal to the vehicle ground-speed U minus a predetermined wheel slip ratio Ss, which is larger than the desired wheel slip ratio S.

Figure 16:
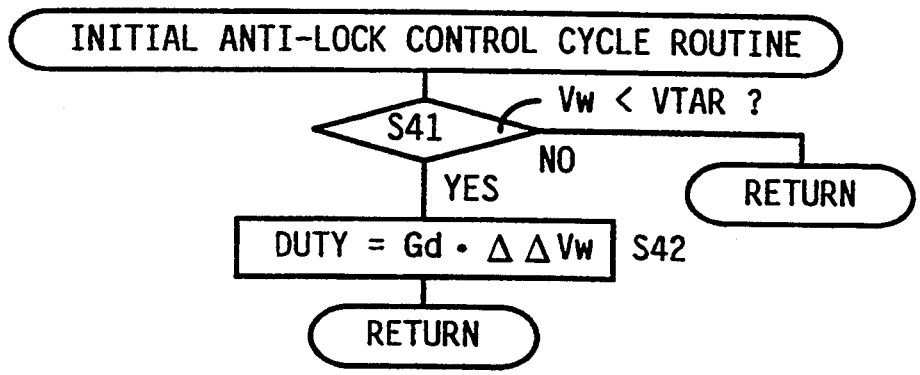
FIG. 16 is a flow chart showing a modification of the initial anti-lock control cycle routine of FIG. 15.
Figure 17:
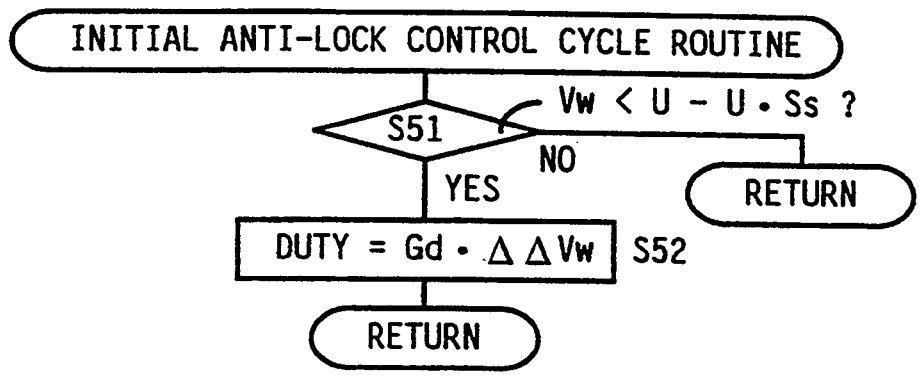
FIG. 17 is a flow chart showing a further modification of the routine of FIG. 15.

All of the three embodiments of FIGS. 15–17 which are applicable to the first control cycle are based on a technical concept of changing the duty cycle DUTY with the rate of change (increase) in the wheel slip amount. This technical concept is also applicable to the second and subsequent control cycles. In this case, the time derivative $\Delta\Delta Vw$ of the wheel speed error $\Delta Vw$ obtained in the first control cycle is stored in the RAM as the rate of increase in the wheel slip amount, and is used in the subsequent control cycles for controlling the duty cycle DUTY depending upon the rate of increase in the wheel slip amount.

Figure 18:
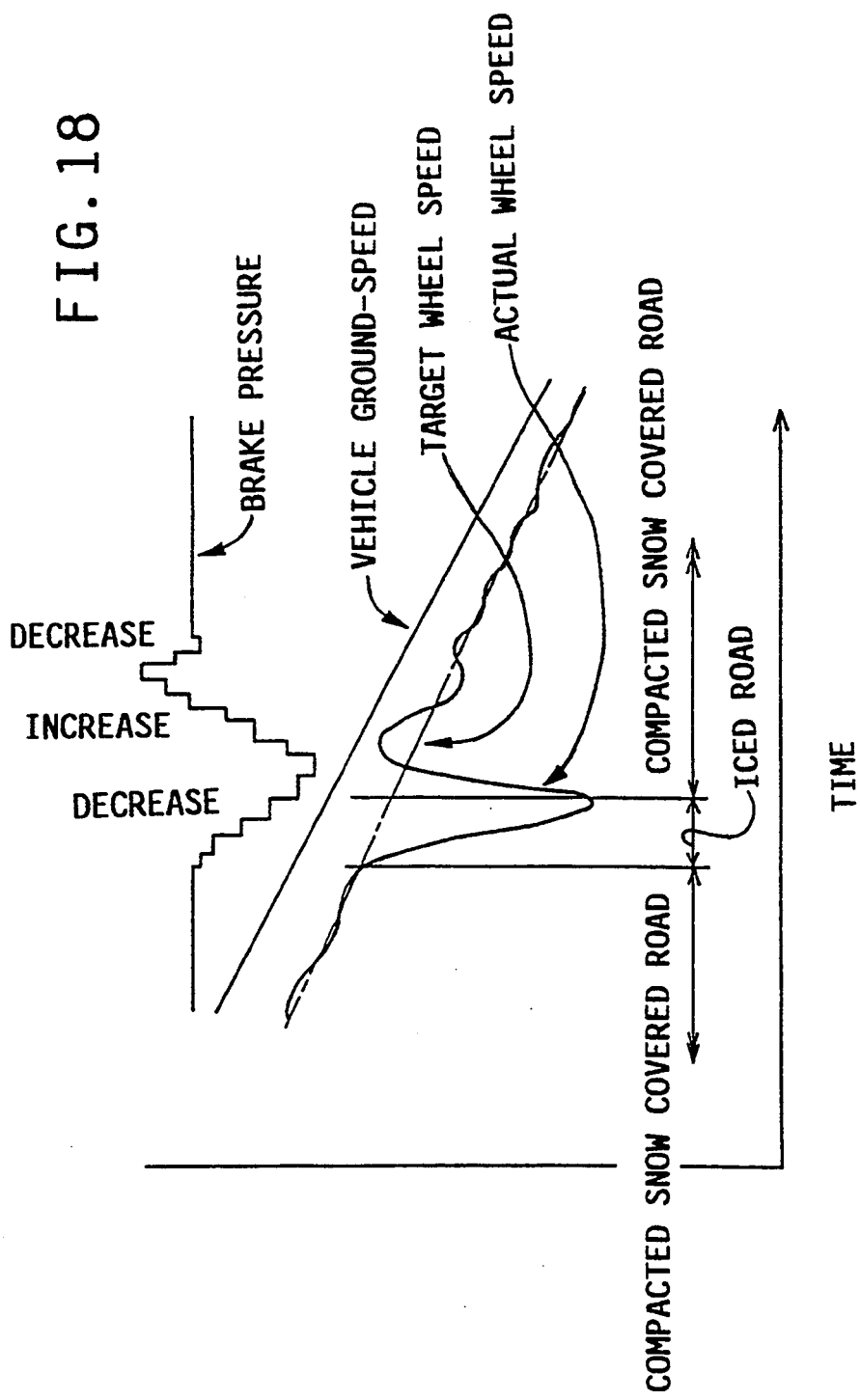
FIG. 18 is a graph showing an example of control of the wheel braking pressure upon changing of the road surface condition from a compacted snow covered state to an iced state, and then to the compacted snow covered state, according to a known brake control apparatus wherein different pressure control modes are available and selected depending upon the estimated vehicle speed.

It is recognized that the multiple-mode type anti-lock brake control apparatus may not start an anti-lock pressure control operation immediately after at least one of the four wheels 1–16 begins to have a locking tendency due to a change in the road surface condition during brake application to the vehicle, for example, from a compacted snow covered road surface with a low friction coefficient $\mu$, to an iced road surface with an extremely low friction coefficient $\mu$. In other words, the anti-lock pressure control operation is started only after at least one wheel has a considerable amount of slip on the iced road surface. In this condition, even the actual slip ratio Sw of the wheel 10–16 whose actual speed Vw is the highest exceeds the normal slip ratio, whereby the estimated vehicle speed is considerably lower than the actual vehicle speed (ground-speed U). In view of this fact, the anti-lock brake control apparatus is usually designed to keep lowering the braking pressure from the beginning of the anti-lock pressure control operation on the road surface with an extremely low friction coefficient $\mu$, until the actual speed Vw of each wheel rises to a level sufficiently close to the target wheel speed VTAR, as indicated in the graph of FIG. 18, in order to minimize the amount of initial drop of the actual wheel speed Vw, so that the actual wheel speed Vw can be rapidly restored to the target level VTAR. An increase in the braking pressure is started only after the actual wheel speed Vw rises sufficiently close to the target level VTAR as a result of the initial continuous reduction of the braking pressure. Thus, this control arrangement requires an unnecessarily long period of reduction of the braking pressure due to inaccurate estimation of the vehicle speed (ground-speed U), and a rapid switching from the pressure-decrease mode to the pressure-increase mode, which may cause the problem of noise and vibration of the brake system.

The above problem is encountered particularly in the case where a relatively short run of the vehicle on the road surface with an extremely low friction coefficient is followed by a vehicle run on a road surface (e.g., compacted snow covered road surface or asphalt pavement surface) whose friction coefficient $\mu$ is higher. In this case, an initial increase of the braking pressure following the initial continuous decrease will not occur during the short run of the vehicle on the low friction coefficient road surface. That is, the braking pressure is kept decreased until the actual wheel speed Vw rises to a level sufficiently near the target level VTAR, irrespective of the rapid increase of the friction coefficient of the road surface. The initial continuous pressure decrease and the rapid increase of the road surface friction coefficient cooperate to cause a slight degree of overshoot of the actual wheel speed Vw above the target wheel speed VTAR, which cause subsequent frequent alternate pressure-increase and pressure-decrease actions, leading to the brake noise and vibration.

Figure 19:
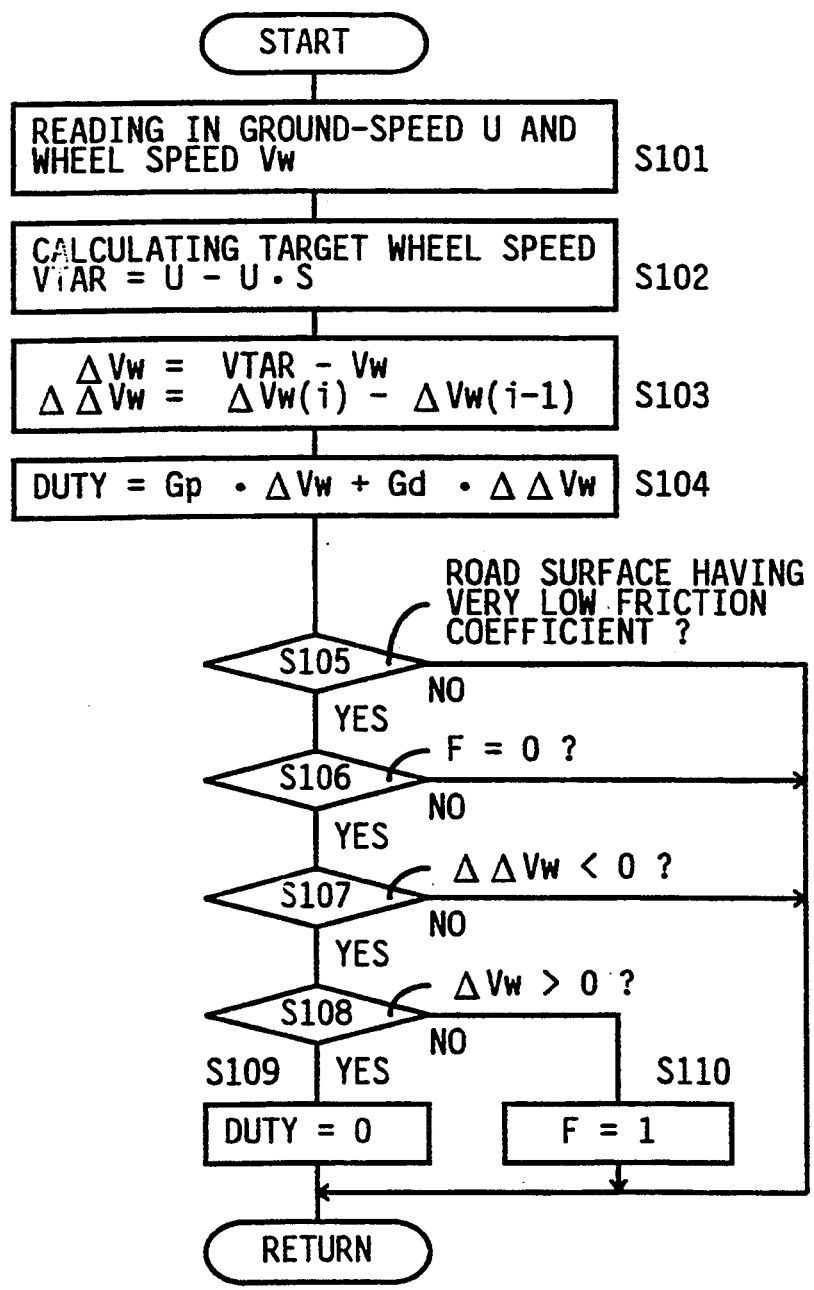
FIG. 19 is a flow chart illustrating the duty cycle calculating routine used in yet another embodiment of this invention.
Figure 20:
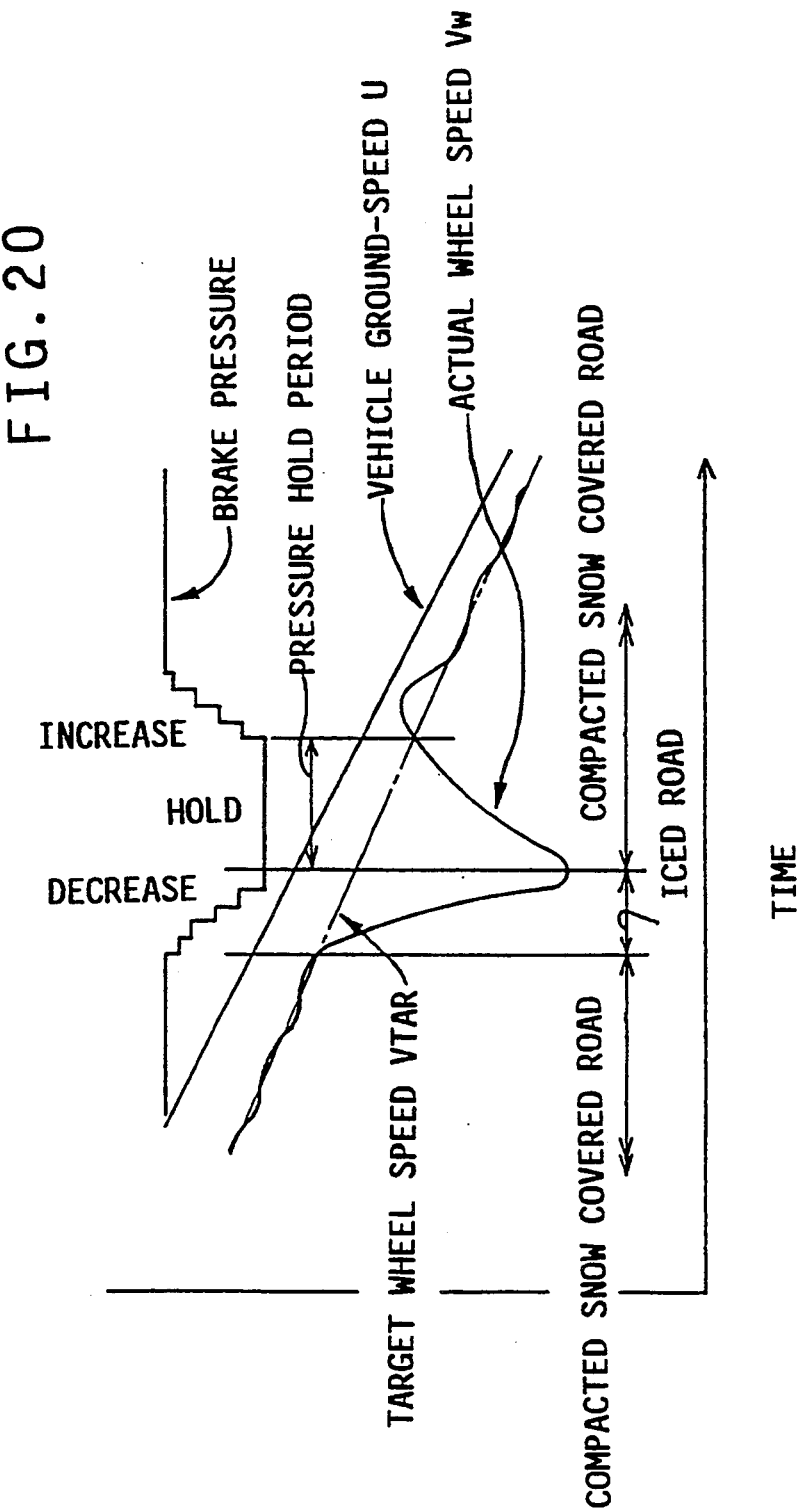
FIG. 20 is a graph showing an example of control of the braking pressure upon changing of the road surface condition, according to the embodiment of FIG. 19.

This problem may be solved by a yet further embodiment of the present invention, in which the ROM of the controller 40 stores a duty cycle calculating routine as illustrated in the flow chart of FIG. 19, which is more or less similar to that of FIG. 4. The graph of FIG. 20 shows an example of control of the braking pressure, in the case where an anti-lock pressure control operation is initiated for at least one of the four wheels 10–16 at the beginning of a comparatively short run of the vehicle on an iced road surface which follows and precedes compacted snow covered road surfaces.

The routine of FIG. 19 is started with step S101 to read in the vehicle ground-speed U and the actual speed Vw of each wheel from the RAM of the controller 40. Step S101 is followed by step S102 in which the target wheel speed VTAR is calculated by subtracting from the ground-speed U a product of the ground-speed U and the desired wheel slip ratio S. The control flow then goes to step S103 to calculate the wheel speed error $\Delta Vw$ and the time derivative thereof $\Delta\Delta Vw$. Step S103 is followed by step S104 in which the duty cycle DUTY for each wheel 10–16 is calculated as a sum of the product of the proportional control gain Gp and the wheel speed error $\Delta Vw$, and the product of the derivative control gain Gd and the time derivative $\Delta\Delta Vw$.

Then, the control flow goes to step S106 to determine whether the friction coefficient $\mu$ of the road surface is extremely low, i.e., lower than a predetermined threshold. This determination is made depending upon the time derivative $\Delta\Delta Vw$ of the wheel speed error $\Delta Vw$ which was obtained at the start of the present anti-lock pressure control operation. Since an affirmative decision (YES) is obtained in step S105 for the reason indicated above, step S106 is implemented to determine whether or not a flag F is set at "0". The flag F set at "0" permits a continuous pressure-hold action to hold the braking pressure applied to the wheel in question. On the other hand, the flag F set at "1" inhibits this continuous pressure-hold action. This flag F is reset to "0" when the anti-lock pressure control operation is started. In the first execution of step S106, therefore, an affirmative decision (YES) is obtained, and step S107 is implemented.

Step S107 is provided to determine whether or not the time derivative $\Delta\Delta Vw$ of the wheel speed error $\Delta Vw$ of each wheel 10–16 is a negative value, namely, whether or not the actual wheel speed Vw has begun to increase toward the target value VTAR. In an initial period of the anti-lock pressure control operation, the time derivative $\Delta\Delta Vw$ is usually a positive value, and a negative decision (NO) is obtained in step S107. The first cycle of execution of the routine of FIG. 19 is thus terminated. As a result, the solenoid-operated valve corresponding to the wheel in question is operated at the duty cycle DUTY calculated in step S104, in the valve drive routine.

As steps S101–S107 are repeatedly implemented, the time derivative $\Delta\Delta Vw$ becomes smaller than zero, i.e., becomes negative, and an affirmative decision (YES) is obtained in step S107. This means that the actual wheel speed Vw begins to rise toward the target value VTAR. In this case, step S108 is implemented to determine whether or not the wheel speed error $\Delta Vw$ is larger than zero, that is, whether or not the actual wheel speed Vw is lower than the target value VTAR. Immediately after the actual wheel speed Vw begins to rise, the speed Vw is still lower than the target value VTAR, and an affirmative decision (YES) is obtained in step S108. Consequently, step S109 is implemented to zero the duty cycle DUTY, and the present control cycle is terminated. As a result, the appropriate solenoid-operated valve is placed in the pressure-hold position (DUTY=0%), with the duty cycle DUTY calculated in step S104 being ignored. The valve is kept in the pressure-hold position until a negative decision (NO) is obtained in step S108, that is, until the actual wheel speed Vw has risen to the target value VTAR.

As steps S101–S109 are repeatedly implemented, the actual wheel speed Vw reaches the target value VTAR, and a negative decision (NO) is obtained in step S108, and step S110 is implemented to set the flag F to "1". In this case, step S109 is not implemented, and the solenoid-operated valve is operated at the duty cycle DUTY calculated in step S104. In the subsequent control cycles, a negative decision (NO) is obtained in step S106 since the flag F has been set to "1", and the valve is operated at the duty cycle DUTY calculated in step S104. Namely, once the actual wheel speed Vw has been restored to the target value VTAR, the continuous pressure-decrease action is inhibited, even if the time derivative $\Delta\Delta Vw$ is negative and the wheel speed error $\Delta Vw$ becomes larger than zero.

In the present embodiment, the duty cycle of the valve is zeroed to hold the braking pressure as soon as the actual wheel speed Vw has begun to increase toward the target value VTAR (when the first affirmative decision is obtained in step S107), as a result of the initial pressure decrease. The braking pressure is held unchanged until the actual wheel speed Vw has been restored to the target value VTAR, which is determined on the basis of the vehicle ground-speed U detected by the ground-speed sensor 8. Although this embodiment is adapted to change the braking pressure of the wheel in question by controlling the duty cycle of the appropriate solenoid-operated valve, the concept of holding the braking pressure according to the present embodiment is applicable to the multiple-mode type brake control apparatus in which the braking pressure is held unchanged by placing the pressure regulating valve in the pressure-hold mode.

In the embodiments which have been described above, the ground-speed sensor 8 is used to detect the ground-speed U of the vehicle relative to the road surface, in the running direction of the vehicle. Preferably, the ground-speed sensor 8 is a Doppler-effect type which utilizes the Doppler effect of a ultrasonic wave. For improved accuracy of detection of the vehicle ground-speed U, the ground-speed sensor 8 is desirably a Doppler-effect type constructed as shown in FIGS. 21 and 22.

Figure 21:
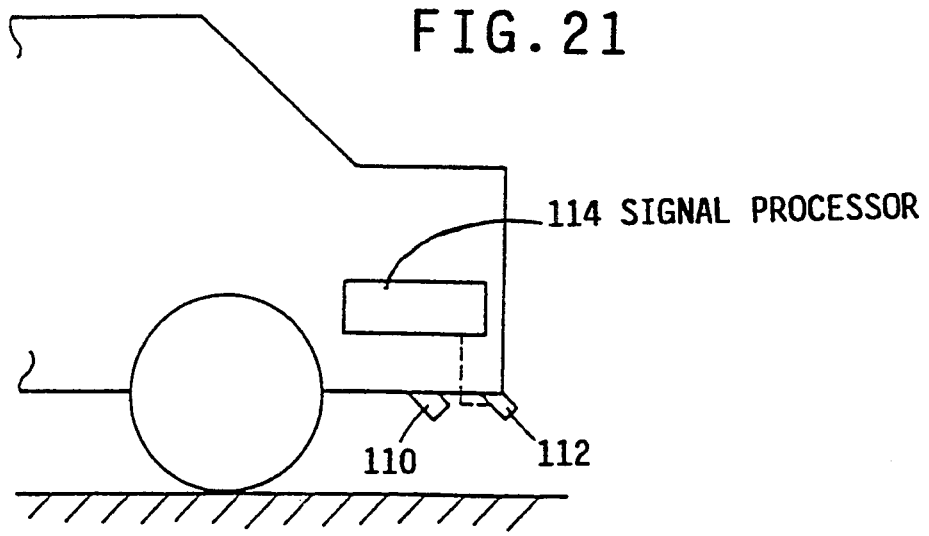
FIG. 21 is a side elevational view schematically showing an ultrasonic vehicle ground-speed sensor used in an embodiment of the anti-lock brake control apparatus of the present invention.
Figure 22:
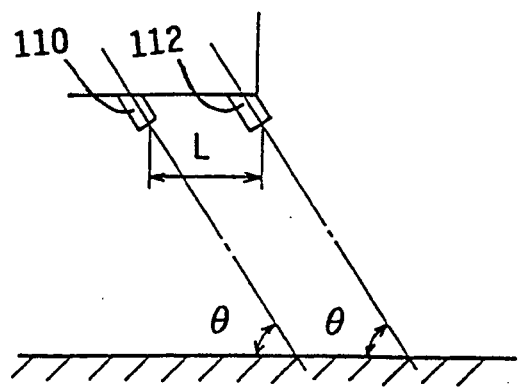
FIG. 22 is a side elevational view indicating the relative position between the transmitter and receiver of the ground-speed sensor.

The ground-speed sensor 8 of FIGS. 21 and 22 includes a transmitter 110 which transmits a ultrasonic wave toward the road surface at a predetermined angle of incidence relative to the road surface as indicated in FIG. 22, and a receiver 112 which receives a portion of the ultrasonic wave irregularly reflected by the road surface and generates an output signal in the form of a sine wave representative of a change in the sound pressure of the received wave.

The transmitter 110 and the receiver 112 are attached to a rear end portion of the underside of the body of the vehicle, such that the receiver 112 is spaced a distance L apart from the transmitter 110 in the backward running direction of the vehicle, as indicated in FIG. 22. The optical axes of the transmitter and receiver 110, 112 are inclined in the backward direction of the vehicle, at the same angle $\theta$ with respect to the road surface.

The Doppler-effect ground-speed sensor 8 further includes a signal processor 114 electrically connected to the receiver 112. The signal processor 114 receives the output of the receiver 112, and calculates the frequency of the wave received by the receiver 112, from the received output of the receiver 112. Described in detail, the signal processor 114 produces pulses corresponding to those of the peaks of the sine wave represented by the output of the receiver 112, which exceed a threshold level. The frequency of the wave received by the receiver 112 is calculated on the basis of the number of the pulses per unit time.

The signal processor 114 further operates to calculate the ground-speed U of the vehicle, according to the following equation, on the assumption that the angle of incidence of the ultrasonic wave from the transmitter 110 upon the road surface, and the angle of propagation of the reflected wave from the road surface with respect to the road surface are both almost equal to the angle of inclination $\theta$ of the optical axes of the transmitter and receiver 110, 112.

$$U = C \cdot (Ft - Fr) / \{(Ft + Fr) \cdot \cos\theta\}$$

where,

C: Sound velocity of the ultrasonic wave
Ft: Frequency of the transmitted ultrasonic wave
Fr: Frequency of the received ultrasonic wave A known Doppler-effect ground-speed sensor suffers from a considerable increase in the error or variation in the detected ground-speed U, when the actual ground-speed U exceeds about 100 km/h, as indicated by solid line in the graph of FIG. 23. This increase in the output variation appears to result from a decrease in the intensity of the wave received by the receiver 112 as the actual ground-speed U increases. That is, when the actual ground-speed U is relatively high, the number of the peaks of the sine wave represented by the output of the receiver 112, which peaks exceed the threshold, tends to decrease leading to the reduction in the number of the corresponding pulses from which the frequency Fr of the wave received by the receiver 112. Accordingly, the frequency Fr as calculated by the signal processor 114 tends to be lower than the actual frequency of the received wave.

In the Doppler-effect ground-speed sensor 8, the receiver 112 is spaced the predetermined distance L apart from the transmitter 110 in the backward running direction of the vehicle, so that the irregularly reflected wave received by the receiver 112 is more similar to the wave regularly reflected by the road surface, than in the known sensor.

Figure 23:
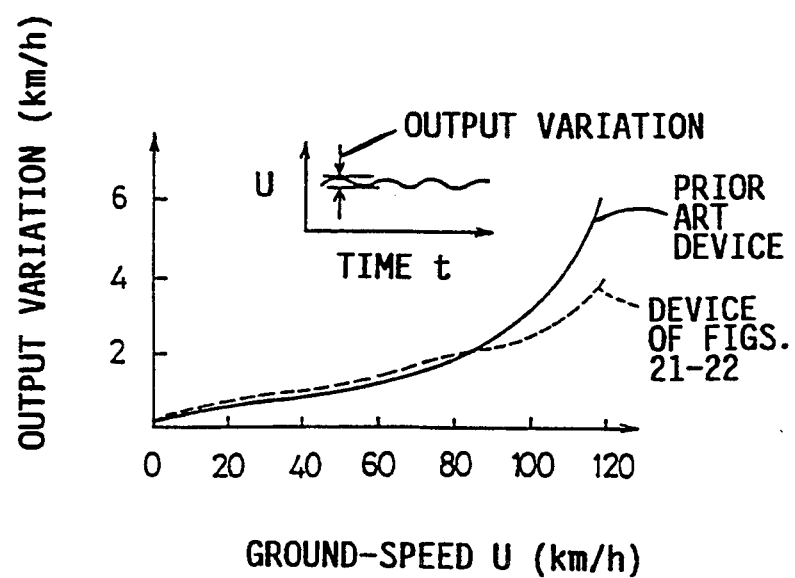
FIG. 23 is a graph indicating amounts of variation in the vehicle ground-speeds detected by the sensor of FIG. 21 and a prior art sensor.
Figure 24:
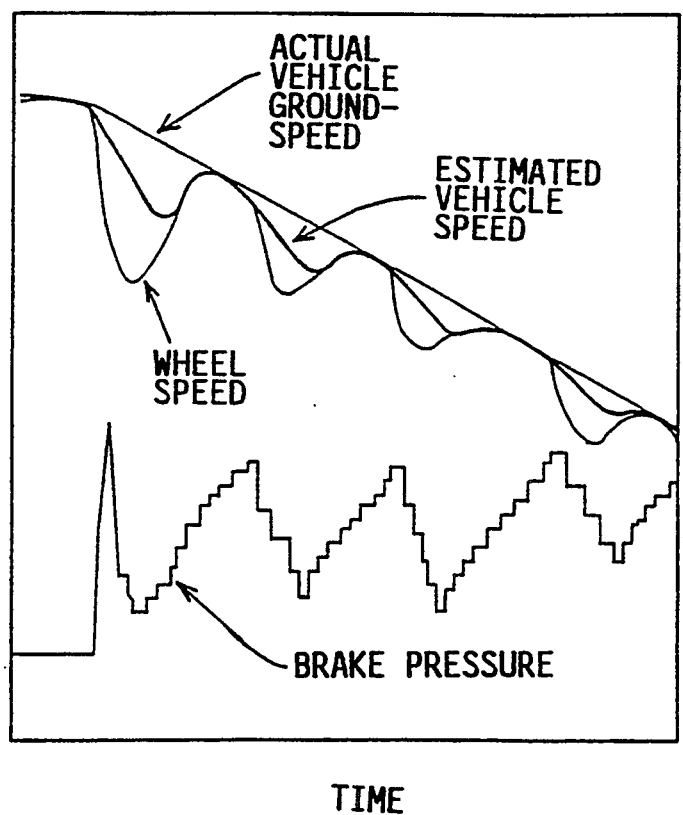
FIG. 24 is a graph illustrating an example of control of the wheel braking pressure by a known anti-lock brake control apparatus of the type in which the braking pressure is controlled in one of different modes depending upon the estimated vehicle speed.

As shown by dashed line in FIG. 23, the above arrangement of the transmitter and receiver 110, 112 assures a significant decrease in the amount of increase in the output variation when the actual ground-speed U exceeds about 100 km/h. As a result, the overall output variation of the sensor over the entire range of the vehicle speed is significantly reduced. In other words, the range of the vehicle ground-speed U that can be accurately detected by the sensor is widened.

The curve indicated by the dashed line in the graph of FIG. 23 was obtained under the following condition or parameters:

Angle of inclination $\theta$ ... 40°
Height of the transmitter and transmitter 110,112 from the road surface ... 300 mm
Sound velocity C ... 350 m/s
Distance L ... 80 mm Although the distance L is 80 mm in the illustrated embodiment, this distance L is equal to a distance of forward movement of the vehicle body (and therefore of the receiver 112) at the vehicle speed of about 100 km/h while the ultrasonic wave generated by the transmitter 110 is reflected by the road surface and is received by the receiver 112. The distance L of 80 mm by which the receiver 112 is spaced rearwardly of the transmitter 110 permits the receiver 112 to receive the wave which is irregularly reflected by the road surface, at the same angle as the irregularly reflected wave which is to be received by the receiver of the known ground-speed sensor when the vehicle is stopped. In other words, the distance L permits the receiver 112 to receive the irregularly reflected wave whose intensity is the same as the irregularly reflected wave received by the receiver of the known sensor when the vehicle is stopped. Thus, the distance L permits reduction in the amount of increase in the output variation or error of the sensor, when the actual vehicle speed is higher than about 100 km/h.

The Doppler-effect ground-speed sensor shown in FIGS. 21 and 22 has a further advantage, when the output of the sensor obtained in a given period is averaged before it is used for an anti-lock pressure control operation as described above. That is, the reduced output variation of the ground-speed sensor makes it possible to shorten the time necessary to average the output, and thereby improve the response of the averaged sensor output to the change in the actual ground-speed of the vehicle, whereby the response of the anti-lock brake control apparatus is accordingly enhanced.

In the illustrated Doppler-effect ground-speed sensor of FIGS. 21 and 22, the signal processor 114 is adapted to calculate the ground-speed U of the vehicle on the assumption that the angle of incidence of the transmitted ultrasonic wave upon the road surface and the angle of propagation of the reflected wave from the road surface toward the receiver 112 are almost equal to the inclination angle $\theta$ of the optical axes of the transmitter and receiver 110, 112, as described above. However, the angle of incidence of the transmitted wave and the angle of propagation of the reflected wave may be actually detected, so that the ground-speed U is calculated on the basis of the detected angles.

If the optical axes of the transmitter and receiver 110, 112 are inclined in the forward running direction of the vehicle with respect to the vertical direction (direction perpendicular to the running directions), the receiver 112 is spaced apart from the transmitter 112 in the forward running direction.

While the present invention has been described in its presently preferred embodiments, for illustrative purpose only, it is to be understood that the invention is not limited to the details of the illustrated embodiment, but may be embodied with various changes, modifications and improvements, which may occur to those skilled in the art, in the light of the foregoing teachings, without departing from the spirit and scope of the invention defined in the following claims.

What is claimed is:

1. A control apparatus for controlling an anti-lock brake system for a vehicle having a plurality of wheel speed sensors for detecting actual speeds of respective wheels of the vehicle, an electrically controlled brake pressure regulating device including at least one solenoid-operated valve for regulating a braking pressure applied to each of said plurality of wheels, and a controller for controlling said pressure regulating device so as to prevent locking of each said wheel, on the basis of a relationship between the actual speed of the wheel detected by the corresponding wheel speed sensor, and a running speed of the vehicle, said control apparatus comprising:

a ground-speed sensor for detecting as said running speed a ground-speed of the vehicle relative to a road surface; and said controller controlling each of said at least one solenoid-operated valve at a controlled duty cycle, so as to prevent the locking of each said wheel, said controller comprising duty cycle determining means for determining the duty cycle of each said solenoid-operated valve, on the basis of at least a wheel speed error and a time derivative of said wheel speed error, said wheel speed error being a deviation of said actual speed of the wheel detected by said corresponding wheel speed sensor, from a target wheel speed obtained on the basis of the ground-speed of the vehicle detected by said ground-speed sensor.

2. A control apparatus according to claim 1, wherein said duty cycle determining means of said controller determines as said duty cycle a sum of a first product of said wheel speed error and a proportional control gain, and a second product of said time derivative of said wheel speed error and a derivative control gain.

3. A control apparatus according to claim 2, wherein said duty cycle determining means comprises gain determining means for determining said proportional control gain such that said proportional control gain is zero when said wheel speed error is not lower than a threshold, and such that said proportional control gain is equal to a value other than zero when said wheel speed error is higher than said threshold.

4. A control apparatus according to claim 1, wherein said controller comprises target speed determining means for determining said target wheel speed by subtracting from said ground-speed of the vehicle a product of said ground-speed and a target slip ratio of the wheels.

5. A control apparatus according to claim 1, wherein said controller comprises target speed determining means for determining said target wheel speed by subtracting from said ground-speed of the vehicle a product of said ground-speed and a target slip ratio of the wheels when said ground-speed is higher than a threshold, and by subtracting a predetermined constant value from said ground-speed when said ground-speed is not higher than said threshold.

6. A control apparatus according to claim 1, wherein said duty cycle determining means of said controller determines said duty cycle on the basis of said ground-speed of the vehicle, as well as on the basis of said wheel speed error and said time derivative of said wheel speed error.

7. A control apparatus according to claim 6, wherein said duty cycle determining means determines as said duty cycle a sum of a first product of said wheel speed error and a proportional control gain, and a second product of said time derivative of said wheel speed error and a derivative control gain, said duty cycle determining means changing at least one of said proportional and derivative control gains with said ground-speed of the vehicle.

8. A control apparatus according to claim 1, wherein said duty cycle determining means of said controller determines said duty cycle on the basis of at least a rate of increase in a slip amount of the wheel, during an initial period following commencement of an anti-lock brake pressure control operation of each said solenoid-operated valve at said controlled duty cycle.

9. A control apparatus according to claim 8, wherein said duty cycle determining means uses said time derivative of said wheel speed error as said rate of increase in said slip amount, and determines, as said duty cycle during said initial period, a product of said time derivative and an initial derivative control gain which increases with said ground-speed of the vehicle, said duty cycle control means determining, as said duty cycle during a subsequent period of said anti-lock brake pressure control operation which follows said initial period, a sum of a first product of said time derivative and a fixed subsequent derivative control gain, and a second product of said time derivative and a proportional control gain.

10. A control apparatus according to claim 1, wherein said ground-speed sensor is a Doppler-effect type sensor including:
(a) a transmitter attached to a body of the vehicle and transmitting a wave toward a road surface in a predetermined direction of propagation;
(b) a receiver attached to said body and receiving a portion of said wave which is irregularly reflected by said road surface, said receiver being spaced apart from said transmitter in one of opposite running directions of the vehicle in which said predetermined direction of propagation is inclined with respect to a downward direction perpendicular to the running directions; and
(c) a signal processor which provides an output representative of said ground-speed of the vehicle, on the basis of frequencies of said wave transmitted by said transmitter and said portion received by said receiver.

11. A control apparatus for controlling an anti-lock brake system for a vehicle having a plurality of wheel speed sensors for detecting actual speeds of respective wheels of the vehicle, an electrically controlled brake pressure regulating device including at least one solenoid-operated valve for regulating a braking pressure applied to each of said plurality of wheels, and a controller for controlling said pressure regulating device so as to prevent locking of each said wheel, on the basis of a relationship between the actual speed of the wheel detected by the corresponding wheel speed sensor, and a running speed of the vehicle, said control apparatus comprising:
a ground-speed sensor for detecting as said running speed a ground-speed of the vehicle relative to a road surface; and
said controller controlling each of said at least one solenoid-operated valve at a controlled duty cycle, so as to prevent the locking of each said wheel, said controller comprising duty cycle determining means for determining the duty cycle of each said solenoid-operated valve, on the basis of at least a wheel speed error and an actual wheel acceleration value, said wheel speed error being a deviation of said actual speed of the wheel detected by said corresponding wheel speed sensor, from a target wheel speed obtained on the basis of the ground-speed of the vehicle detected by said ground-speed sensor, said actual wheel acceleration value being a time derivative of said actual speed of the wheel.

12. A control apparatus according to claim 11, wherein said duty cycle determining means of said controller determines said duty cycle on the basis of said ground-speed of the vehicle, as well as on the basis of said wheel speed error and said actual wheel acceleration.

13. A control apparatus according to claim 11, wherein said duty cycle determining means of said controller determines said duty cycle on the basis of at least a rate of increase in a slip amount of the wheel, during an initial period following commencement of an anti-lock brake pressure control operation of each said solenoid-operated valve at said controlled duty cycle.

14. A control apparatus according to claim 11, wherein said ground-speed sensor is a Doppler-effect type sensor including:
(a) a transmitter attached to a body of the vehicle and transmitting a wave toward a road surface in a predetermined direction of propagation;
(b) a receiver attached to said body and receiving a portion of said wave which is irregularly reflected by said road surface, said receiver being spaced apart from said transmitter in one of opposite running directions of the vehicle in which said predetermined direction of propagation is inclined with respect to a downward direction perpendicular to the running directions; and
(c) a signal processor which provides an output representative of said ground-speed of the vehicle, on the basis of frequencies of said wave transmitted by said transmitter and said portion received by said receiver.

* * * * *